(12) United States Patent
Horn et al.

(10) Patent No.: US 9,503,833 B2
(45) Date of Patent: Nov. 22, 2016

(54) SYSTEM AND METHOD FOR NETWORK PROVISIONING OF MOBILE ENTITIES FOR PEER-TO-PEER SERVICE

(75) Inventors: Gavin Bernard Horn, La Jolla, CA (US); Miguel Griot, San Diego, CA (US); Gerardo Giaretta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 158 days.

(21) Appl. No.: 13/427,818

(22) Filed: Mar. 22, 2012

(65) Prior Publication Data

US 2012/0243437 A1 Sep. 27, 2012

Related U.S. Application Data

(60) Provisional application No. 61/466,505, filed on Mar. 23, 2011.

(51) Int. Cl.
| | |
|---|---|
| *H04L 12/28* | (2006.01) |
| *H04W 4/00* | (2009.01) |
| *H04W 76/02* | (2009.01) |
| *H04W 12/04* | (2009.01) |

(Continued)

(52) U.S. Cl.
CPC ............. *H04W 4/001* (2013.01); *H04W 12/04* (2013.01); *H04W 76/023* (2013.01); *H04W 8/245* (2013.01); *H04W 28/18* (2013.01); *H04W 84/18* (2013.01)

(58) Field of Classification Search
CPC .................................................. H04W 84/18
USPC .................... 370/254, 312, 401, 328–339; 709/227–231
See application file for complete search history.

(56) References Cited

U.S. PATENT DOCUMENTS

| | | |
|---|---|---|
| 7,283,832 B2 | 10/2007 | Jia et al. |
| 7,974,234 B2 | 7/2011 | Gustave et al. |

(Continued)

FOREIGN PATENT DOCUMENTS

| | | |
|---|---|---|
| CN | 1430861 A | 7/2003 |
| CN | 1622678 A | 6/2005 |

(Continued)

OTHER PUBLICATIONS

Al-Dulaimi, A. & Al-Raweshidy, H., Multi-Operator Cognitive Radios Sharing One Channel, Proceedings of the 7th ACM International Symposium on Mobility Management and Wireless Access, 2009, pp. 114-117, doi: 10.1145/1641776.1641796.

(Continued)

*Primary Examiner* — Iqbal Zaidi
(74) *Attorney, Agent, or Firm* — Harrity & Harrity, LLP

(57) ABSTRACT

Techniques are provided for peer-to-peer (P2P) service provisioning. For example, there is provided a method, operable by a network entity, that may involve determining a set of region-specific parameters for use in the P2P service in a coverage area. The method may involve providing the set of the region-specific parameters to at least one user equipment (UE) for configuration of the at least one UE for the P2P service, in response to the at least one UE entering the coverage area. In related aspects, the set of the region-specific parameters may include RF parameters, service discovery parameters, connection establishment parameters, and/or security parameters.

26 Claims, 23 Drawing Sheets

(51) Int. Cl.
*H04W 84/18* (2009.01)
*H04W 8/24* (2009.01)
*H04W 28/18* (2009.01)

(56) References Cited

U.S. PATENT DOCUMENTS

| | | | |
|---|---|---|---|
| 8,903,390 B2 | 12/2014 | Yoon et al. | |
| 2009/0088183 A1* | 4/2009 | Piersol et al. | 455/456.1 |
| 2010/0169498 A1 | 7/2010 | Palanki et al. | |
| 2011/0258327 A1 | 10/2011 | Phan et al. | |
| 2011/0294474 A1* | 12/2011 | Barany et al. | 455/414.1 |
| 2012/0026865 A1* | 2/2012 | Fan | H04W 76/02 370/225 |
| 2012/0331166 A2* | 12/2012 | Stirbu | H04W 8/18 709/230 |

FOREIGN PATENT DOCUMENTS

| | | | | |
|---|---|---|---|---|
| CN | WO2005053347 | * | 6/2005 | ............... H04Q 7/38 |
| CN | WO 2005053347 A1 | * | 6/2005 | .......... H04W 76/023 |
| JP | 2008510341 A | | 4/2008 | |
| JP | 2008510344 A | | 4/2008 | |
| JP | 2013507029 A | | 2/2013 | |
| WO | 2004077917 A2 | | 9/2004 | |
| WO | WO2005053347 | * | 6/2005 | ........... H04W 84/18 |
| WO | WO-2006016328 A1 | | 2/2006 | |
| WO | WO-2006016331 A1 | | 2/2006 | |
| WO | WO-2010002302 A1 | | 1/2010 | |
| WO | 2010078273 A2 | | 7/2010 | |
| WO | WO-2010132710 A1 | | 11/2010 | |
| WO | 2011039719 A1 | | 4/2011 | |
| WO | WO-2012088470 A1 | | 6/2012 | |

OTHER PUBLICATIONS

International Search Report and Written Opinion—PCT/US2012/030318—ISA/EPO—Jun. 1, 2012.
Taiwan Search Report—TW101110218—TIPO—Jun. 23, 2014.
Garcia G: "P2PSIP Bootstrapping Using DNS-SD, draft-garcia-p2psip-dns-sd-bootstrapping-00.txt", JCT-VC Meeting; 96. MPEG Meeting, Mar. 16, 2011-Mar. 23, 2011, Geneva, (Joint Collaborative Team on Video Coding of ISO/IEC JTC1/SC29/WG11 and ITU-T SG.16 ), URL: http://wftp3.itu.int/av-arch/jctvc-site/, Internet Engineering Task Force, IETF, CH, Oct. 22, 2007 (Oct. 22, 2007), pp. 11, XP015052907, ISSN: 0000-0004.

* cited by examiner

| Example use case | SD Prefix | SD Suffix |
|---|---|---|
| Advertising a general service such as a printer, Internet access, etc. | Managed | Plain text |
| Advertising a public multi-player game that allows connectivity with any player. | Managed | Plain text |
| Advertising a public multi-player game that allows connectivity only with friends. | Managed | Encrypted |
| Advertising a public social networking application like a Face book or Skype where only friends/contacts recognize the user/device. | Managed | Encrypted |
| Advertising a private multi-player game that allows connectivity only with friends. | Unmanaged | Encrypted |
| Advertising a private social networking application like a Face book or Skype where only friends/contacts recognize the user/device. | Unmanaged | Encrypted |

*FIG. 6*

| Field | Sent in | Notes |
|---|---|---|
| RF | OMA DM or SIB (read only) | These parameters may include maximum PDS Tx power, resource usage (e.g., PDS Tx frequency), licensed vs. unlicensed spectrum, etc. |
| MaxDirectConnections | OMA DM (read only) | Indicates the maximum number of SD IDs that the UE may advertise simultaneously |
| MaxDirectConnections | OMA DM (read only) | Indicates the maximum number of simultaneous direct connections that the UE is allowed to establish |
| Authorized SD list | OMA DM (read only) | A list stored in the UE, under operator control, containing the SD IDs and SD Prefixes which the UE is authorized to advertise for discovery or establish a direct connection for.<br><br>The Authorized SD list is a part of the SD MO as described in section 7.1.2. |
| Security keys | OMA DM | These parameters are needed to advertise and detect peers on the PDS as well as for establishing a direct connection (Details are FFS) |

FIG. 14

SYSTEM AND METHOD FOR NETWORK PROVISIONING OF MOBILE ENTITIES FOR PEER-TO-PEER SERVICE

CROSS-REFERENCE TO RELATED APPLICATION

The present Application for Patent claims priority to Provisional Application No. 61/466,505, filed Mar. 23, 2011, entitled "SYSTEM AND METHOD FOR NETWORK PROVISIONING OF MOBILE ENTITIES FOR PEER-TO-PEER SERVICE", and is assigned to the assignee hereof, and is hereby expressly incorporated in its entirety by reference herein.

BACKGROUND

Field

The present application relates generally to wireless communications, and more specifically to techniques for provisioning wireless devices for peer-to-peer service, such as device-to-device communication.

Background

The 3rd Generation Partnership Project (3GPP) Long Term Evolution (LTE) represents a major advance in cellular technology and is the next step forward in cellular 3G services as a natural evolution of Global System for Mobile communications (GSM) and Universal Mobile Telecommunications System (UMTS). The LTE physical layer (PHY) is a highly efficient means of conveying both data and control information between an evolved NodeB (eNB) and mobile entities, such as, for example, access terminals (ATs) or user equipment (UE). The LTE PHY employs some advanced technologies that are new to cellular applications. These include Orthogonal Frequency Division Multiplexing (OFDM) and Multiple Input Multiple Output (MIMO) data transmission. In addition, the LTE PHY uses Orthogonal Frequency Division Multiple Access (OFDMA) on the downlink (DL) and Single-Carrier Frequency Division Multiple Access (SC-FDMA) on the uplink (UL). OFDMA allows data to be directed to or from multiple users on a subcarrier-by-subcarrier basis for a specified number of symbol periods.

Examples of older wireless communication systems widely deployed to provide various types of communication content such as voice and data include Code Division Multiple Access (CDMA) systems, including CDMA2000, Wideband CDMA, Global System for Mobile communications (GSM), and Universal Mobile Telecommunication System (UMTS). These wireless communication systems and LTE systems generally use different radio access technologies (RATs) and communication protocols, operate at different frequency bands, provide different quality of service (QoS), and offer different types of services and applications to the system users.

In a direct wireless connection, a first mobile entity transmits a wireless signal directly to a second mobile entity, which receives and processes the wireless signal. Examples of direct wireless connections include connections from a mobile entity to eNB(s) in LTE or other wireless communications protocols, or peer-to-peer (P2P) connections between mobile entities as used in non-cellular protocols such as WiFi Direct or Bluetooth. Cellular wireless communications systems do not typically include direct connections between mobile entities. Rather, the mobile entities typically communicate indirectly with one another through one or more NodeBs and associated network infrastructure.

In this context, there is a need for efficiently provisioning mobile entities for a P2P service, such as, for example, device-to-device communication.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more aspects of the embodiments described herein, there is provided a method for provisioning peer-to-peer (P2P) service by a network entity (e.g., a P2P configuration server or the like). The method may involve determining a set of region-specific parameters for use in the P2P service in a coverage area. The method may involve providing the set of the region-specific parameters to at least one user equipment (UE) for configuration of the at least one UE for the P2P service, in response to the at least one UE entering the coverage area. In related aspects, the set of the region-specific parameters comprises at least one of RF parameters, service discovery parameters, connection establishment parameters, and security parameters. In further related aspects, an electronic device (e.g., a P2P configuration device or component(s) thereof) may be configured to execute the above-described methodology.

In accordance with one or more aspects of the embodiments described herein, a method is provided a method for provisioning peer-to-peer (P2P) service by a mobile entity (e.g., a UE or the like). The method may involve receiving a set of region-specific parameters from a network entity for use in the P2P service in a coverage area, in response to the mobile entity entering the coverage area. The method may involve enabling the P2P service at the mobile entity based at least in part on the received set of region-specific parameters. In related aspects, an electronic device (e.g., a UE or component(s) thereof) may be configured to execute the above-described methodology.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

BRIEF DESCRIPTION OF THE DRAWINGS

FIG. 6 provides a table illustrating cases of setting the SD ID to achieve different levels of privacy.

FIG. 14 provides a table with parameters that may be provisioned for discovery and direct connection establishment procedures on the UE.

DESCRIPTION

Figure 1:
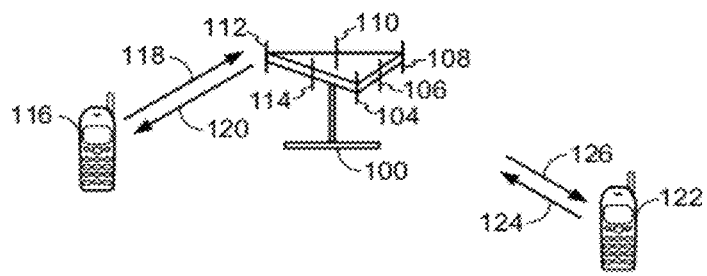
FIG. 1 illustrates a multiple access wireless communication system.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. In the following description, for reasons of conciseness and clarity, terminology associated with W-CDMA and LTE standards, as promulgated under the 3GPP standards by the International Telecommunication Union (ITU), is used. It should be emphasized that the techniques described herein are applicable to other technologies, such as the technologies and standards mentioned above.

Single-Carrier Frequency Division Multiple Access (SC-FDMA), which utilizes single carrier modulation and frequency domain equalization, has similar performance and essentially the same overall complexity as those of OFDMA systems. An SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. SC-FDMA is used for uplink multiple access in 3GPP LTE, or Evolved UTRA.

Referring to FIG. 1, a multiple access wireless communication system according to one embodiment is illustrated. An access point 100 (e.g., base station, evolved NodeB (eNB), or the like) includes multiple antenna groups, one including 104 and 106, another including 108 and 110, and an additional one including 112 and 114. In FIG. 1, two antennas are shown for each antenna group, however, more or fewer antennas may be utilized for each antenna group. A mobile entity 116 is in communication with the antennas 112 and 114, where the antennas 112 and 114 transmit information to the mobile entity 116 over a forward link 120 and receive information from the mobile entity 116 over a reverse link 118. A mobile entity 122 is in communication with the antennas 104 and 106, where the antennas 104 and 106 transmit information to the mobile entity 122 over a forward link 126 and receive information from the mobile entity 122 over a reverse link 124. In a Frequency Division Duplex (FDD) system, the communication links 118, 120, 124 and 126 may use different frequencies for communication. For example, the forward link 120 may use a different frequency than that used by the reverse link 118.

Each group of antennas and/or the area in which they are designed to communicate is often referred to as a sector of the access point. In certain embodiments, antenna groups each are designed to communicate with mobile entities in a sector, of the areas covered by the access point 100.

In communication over the forward links 120 and 126, the transmitting antennas of the access point 100 may utilize beamforming in order to improve the signal-to-noise ratio of forward links for the different mobile entities 116 and 122. Also, an access point using beamforming to transmit to mobile entities scattered randomly through its coverage causes less interference to mobile entities in neighboring cells than an access point transmitting through a single antenna to all its mobile entities.

An access point may be a fixed station used for communicating with the terminals and may also be referred to as an access point, a NodeB, an eNB, or some other terminology. A mobile entity may also be referred to as an access terminal (AT), a user equipment (UE), a mobile station, a wireless communication device, terminal, or the like.

Figure 2:
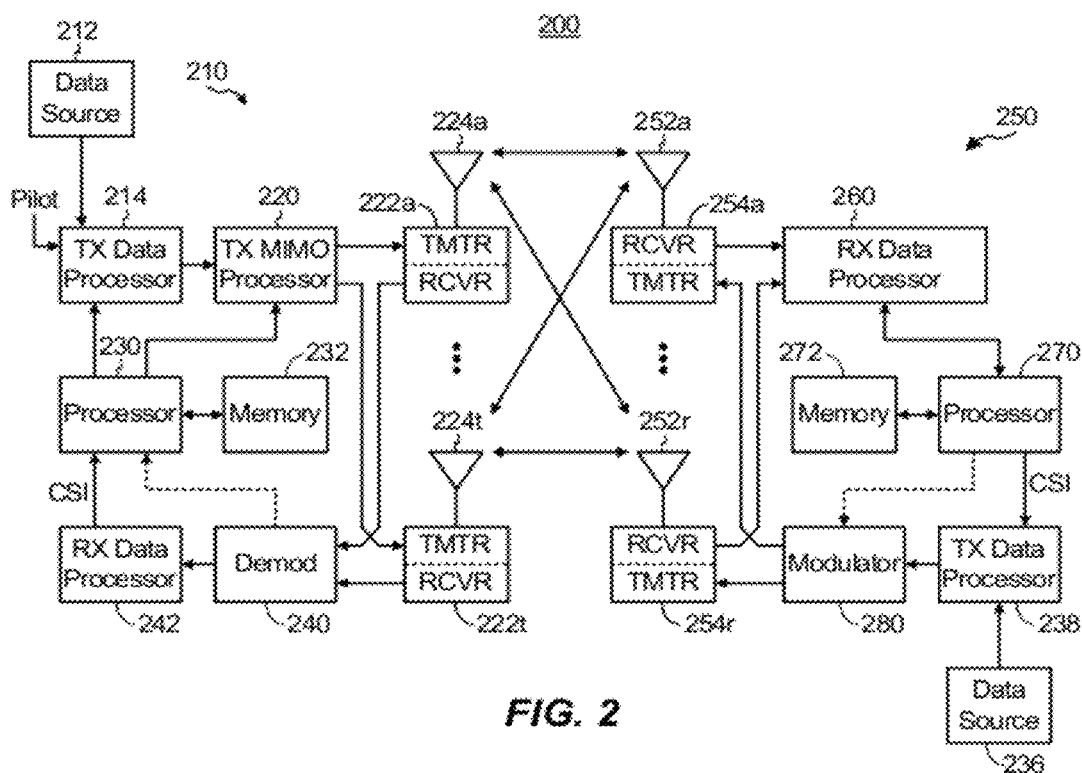
FIG. 2 illustrates a block diagram of a communication system.

FIG. 2 is a block diagram of an embodiment of a transmitter system 210 (also known as an access point) and a receiver system 250 (also known as a mobile entity) in a MIMO system 200. At the transmitter system 210, traffic data for a number of data streams is provided from a data source 212 to a transmit (TX) data processor 214.

In an embodiment, each data stream is transmitted over a respective transmit antenna. The TX data processor 214 formats, codes, and interleaves the traffic data for each data stream based on a particular coding scheme selected for that data stream to provide coded data.

The coded data for each data stream may be multiplexed with pilot data using

OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., Binary Phase Shift Keying (BPSK), Quadrature Phase Shift Keying (QSPK), M-ary Phase-Shift Keying (M-PSK), or Multi-Level Quadrature Amplitude Modulation (M-QAM)) selected for that data stream to provide modulation symbols. The data rate, coding, and modulation for each data stream may be determined by instructions performed by a processor 230, which may be in operative communication with a memory 232.

The modulation symbols for the data streams are then provided to a TX MIMO processor 220, which may further process the modulation symbols (e.g., for OFDM). The TX MIMO processor 220 then provides $N_T$ modulation symbol streams to $N_T$ transmitters (TMTR) 222a through 222t. In certain embodiments, the TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from the transmitters 222a through 222t are then transmitted from $N_T$ antennas 224a through 224t, respectively.

At the receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

A RX data processor 260 then receives and processes the $N_R$ received symbol streams from the $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by the RX data processor 260 is complementary to that performed by the TX MIMO processor 220 and the TX data processor 214 at the transmitter system 210.

A processor 270 periodically determines which pre-coding matrix to use. The processor 270 formulates a reverse link message comprising a matrix index portion and a rank value portion, and may be in operative communication with a memory 272.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by the transmitters 254a through 254r, and transmitted back to the transmitter system 210.

At the transmitter system 210, the modulated signals from the receiver system 250 are received by the antennas 224, conditioned by the receivers 222, demodulated by a demodulator 240, and processed by a RX data processor 242 to extract the reserve link message transmitted by the receiver system 250. The processor 230 then determines which pre-coding matrix to use for determining the beamforming weights then processes the extracted message.

Figure 3:
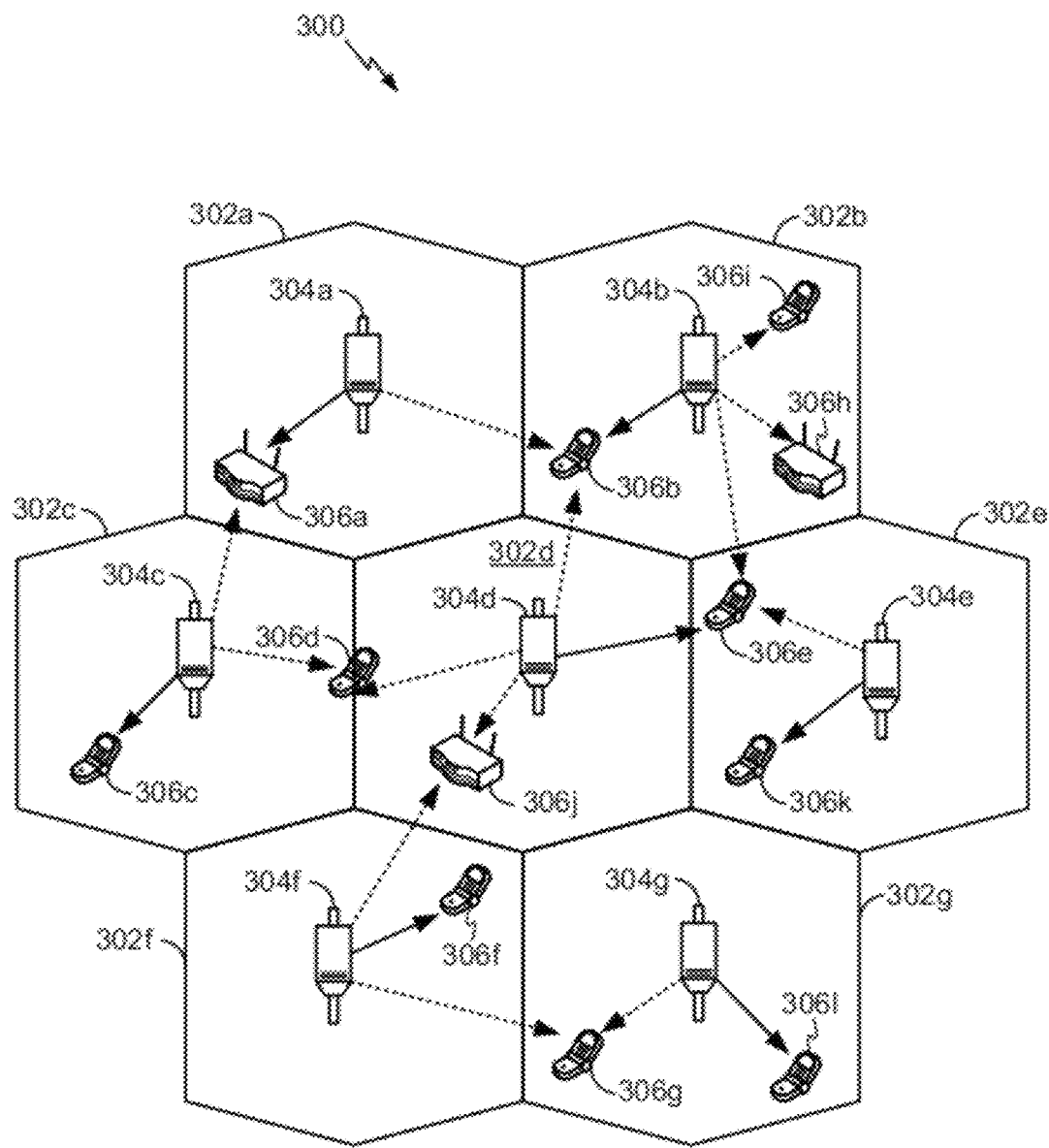
FIG. 3 illustrates a wireless communication system configured to support a number of users.

FIG. 3 illustrates a wireless communication system 300, configured to support a number of users, in which the teachings herein may be implemented. The system 300 provides communication for multiple cells 302, such as, for example, macro cells 302a-302g, with each cell being serviced by a corresponding access node 304 (e.g., access nodes 304a-304g). As shown in FIG. 3, mobile entities 306 (e.g., mobile entities 306a-306l) may be dispersed at various locations throughout the system over time. Each mobile entity 306 may communicate with one or more access nodes 304 on a forward link ("FL") and/or a reverse link ("RL") at a given moment, depending upon whether the mobile entity 306 is active and whether it is in soft handoff (if applicable), for example. The wireless communication system 300 may provide service over a large geographic region. For example, macro cells 302a-302g may cover a few blocks in an urban or suburban neighborhood or a few square miles in a rural environment.

In accordance with aspects of the subject of this disclosure, there is provided a wireless network (e.g., a 3GPP network) having a feature for using a spectrum provider (e.g., an LTE network provider) for peer-to-peer (P2P) communication. In this context, P2P communication is a direct communication between two mobile entities without the need for transportation of communicated data through an access node or a core network node.

Figure 4:
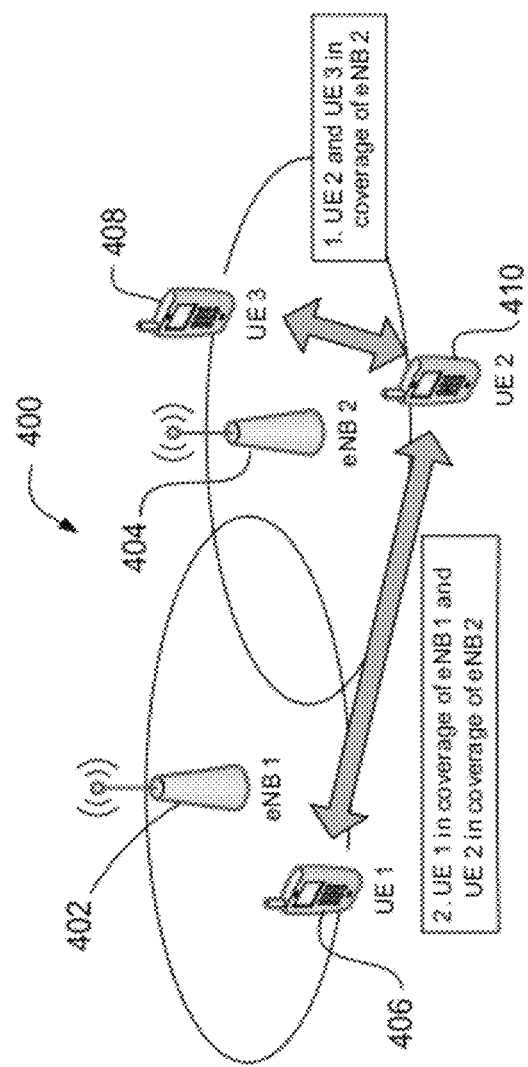
FIG. 4 illustrates mobile entities in communication via a radio access network and via direct wireless connections.

FIG. 4 shows an embodiment of a communication system 400 comprising mobile entities 406, 408, 410 in communication via eNBs 402, 404 of a radio access network (RAN) and via direct wireless connections. The depicted example illustrates peer discovery for (1) UEs 408, 410 camped at a cell on the same eNB 404 and (2) UEs 406, 410 camped at cells for respective different eNBs 402, 404. Peer discovery is a procedure whereby UEs detect the availability of other services advertised at UEs within radio frequency (RF) proximity, and may generally involve peer advertisement and peer detection.

Peer mobile entities may perform detection, wherein authorized mobile entities may receive information to be able to perform detection (e.g., security keys or the like). Also, the peer mobile entities may perform advertising, wherein authorized mobile entities may receive information to be able to advertise a discovery identifier (e.g., security keys). Each mobile entity refrains from advertising a discovery identifier for which it has not been authorized. Further, the peer mobile entities may perform direct communication, wherein each mobile entity refrains from establishing direct communication with a peer advertising a discovery identifier for which it has not been authorized.

It is noted that a network or spectrum provider may authorize a mobile entity to use the network's spectrum to perform the above described P2P communication procedures. It is also noted that the mobile entity may not be provisioned with P2P parameters and may be expected to request authorization for each procedure or set of procedures. For example, the mobile entity may request authorization for detection, detection and advertising, and/or direct communication. Authorization based on the techniques described herein could be: (a) per tracking area for tracking area update (TAU) procedures; (b) while attached for attach procedures; and/or (c) based on a lifetime of reserved bearers for evolved packet system (EPS) session management (ESM) procedures.

Figure 5:
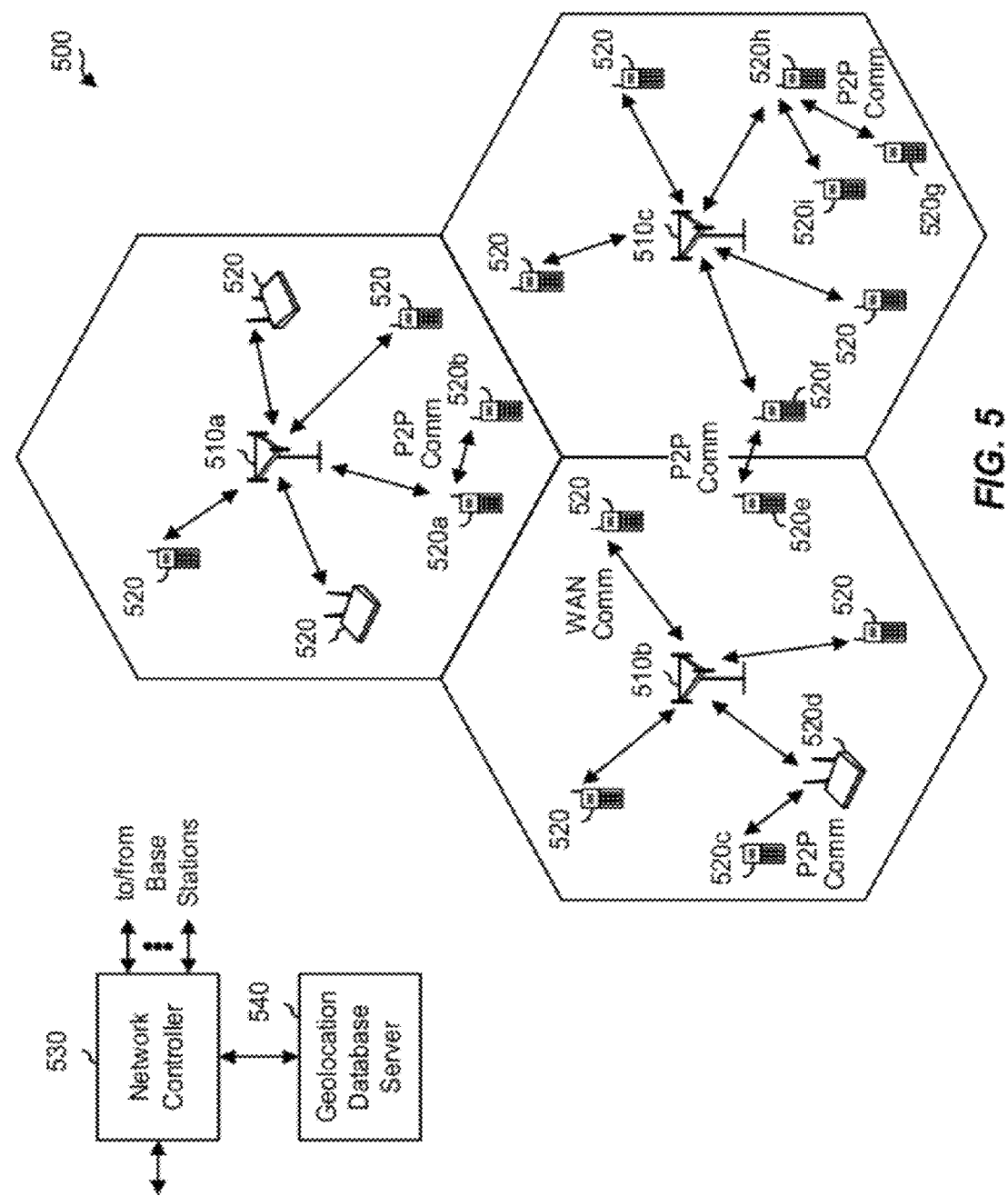
FIG. 5 shows a wireless communication network that supports both WAN communication and P2P communication.

FIG. 5 shows a wide area network (WAN) 500, which may be a LTE network or some other type of WAN. WAN 500 may include a number of base stations and other network entities. For simplicity, only three base stations 510a, 510b and 510c and one network controller 530 are shown in FIG. 5. A base station may be an entity that communicates with the UEs and may also be referred to as a NodeB, an eNB, an access point, etc. Each base station may provide communication coverage for a particular geographic area and may support communication for the UEs located within the coverage area or region. In 3GPP, the term "cell" can refer to a coverage area of a base station and/or a base station subsystem serving this coverage area, depending on the context in which the term is used. In 3GPP2, the term "sector" or "cell-sector" can refer to a coverage area of a base station and/or a base station subsystem serving this coverage area. For clarity, 3GPP concept of "cell" is used in the description herein.

A base station may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group). In the example shown in FIG. 5, WAN 500 includes macro base stations 510a, 510b and 510c for macro cells. WAN 500 may also include pico base stations for pico cells and/or femto/home base stations for femto cells (not shown in FIG. 5).

Network controller 530 may couple to a set of base stations and may provide coordination and control for these base stations. Network controller 530 may communicate with the base stations via a backhaul. The base stations may also communicate with one another via the backhaul. A geolocation database server 540 may couple to network controller 530 and/or other network entities. Server 540 may support use of an unlicensed spectrum, as described below.

In the description herein, a WAN communication may refer to a communication between a UE and a base station, e.g., for a call with a remote station such as another UE. An access link may refer to a communication link between a UE and a base station. A P2P communication may refer to a direct communication between two or more UEs, without going through a base station. Also, a P2P communication may refer to a third-party entity assisted communication between two or more UEs, wherein the third party entity may be a base station, another UE, etc. A P2P link may refer to a communication link between two or more UEs engaged in P2P communication. A P2P group may refer to a group of two or more UEs engaged in P2P communication. In one design, one UE in a P2P group may be designated as a P2P server, and each remaining UE in the P2P group may be designated as a P2P client. The P2P server may perform certain management functions such as exchanging signaling with a WAN, coordinating data transmission between the P2P server and the P2P client(s), etc.

In the example shown in FIG. 5, UEs 520a and 520b are under the coverage of base station 510a and are engaged in P2P communication. UEs 520c and 520d are under the coverage of base station 510b and are engaged in P2P communication. UEs 520e and 520f are under the coverage of different base stations 510b and 510c and are engaged in P2P communication. UEs 520g, 520h and 520i are under the coverage of the same base station 510c and are engaged in P2P communication. The other UEs 120 in FIG. 5 are engaged in WAN communication.

WAN 500 may operate on one or more frequency channels that are licensed to a network operator. WAN 500 may support both WAN communication and P2P communication on the licensed frequency channel(s). In this case, some resources on the licensed frequency channel(s) may be reserved for P2P communication and the remaining resources may be used for WAN communication. The term "spectrum" generally refers to a range of frequencies such as a frequency band, or a frequency channel, etc.

In accordance with one or more aspects of the embodiments described herein, there are provided techniques for network provisioning of a UE for a P2P service, such as, for example, device-to-device communication. On the network side, such techniques may involve determining parameters for use in the device-to-device communication, and sending such parameters to the UE for configuration of the UE for the device-to-device communication. On the UE side, such techniques may involve receiving such parameters, and enabling the device-to-device communication based at lest in part on the received parameters.

With respect to P2P services, such as device-to-device communication, the service discovery identifier (SD ID) is the identifier used in the discovery procedure for advertising and detecting a P2P service. The SD ID may be associated with a SD Name in free text format using, for example, UTF-8 coding (Universal character set Transformation Format—8-bit) or the like. The SD Name may identify, in user readable format, the P2P service advertised in the SD ID. For example, the SD Name may be defined to include one or more of the following fields: a service (e.g., printer), application (e.g., Skype), location (e.g., third floor building X), protocol (e.g., digital audio access protocol), user, device, etc.

In related aspects, an SD ID may include a fixed length SD Prefix and an application dependent SD Suffix. A UE may be provisioned and/or authorized with: a fixed length SD Prefix for authorizing a P2P service; or a complete SD ID for authorizing a specific instance of the P2P service.

For example, two types of SD Prefixes may be defined: a Managed SD ID and an Unmanaged SD ID. A Managed SD ID may use a managed SD prefix that is assigned to the P2P service by the operator or a third party and is guaranteed to uniquely identify the P2P service within its defined domain. The UE can query an Expression Name System (ENS), hosted by the operator or the third party, to determine the P2P service associated with the SD Prefix and vice versa. It may also be possible in some cases for the UE to query the ENS to determine the SD Name associated with a specific SD ID, and vice versa. In this case, it shall be possible for the ENS to limit the time period for which a Managed SD ID is valid, for example, in the case where the UE caches the SD ID to SD Name mapping. It is noted that the SD ID/SD name pair needs to be registered at the ENS via the WAN/

LAN in order for it to be queried by another UE and the ENS needs to be IP-reachable by the UE.

An Unmanaged SD ID may use a reserved Unmanaged SD Prefix common to all Unmanaged SD IDs which does not uniquely identify the P2P service. The advertised SD Suffix in a Proximity Detection Signal (PDS) may vary over time to resolve any collisions with other Unmanaged SD IDs and minimize the probability of false detection of a peer. For example, the SD Name associated with an Unmanaged SD ID may be only available to a UE subscribed to the P2P service associated with the SD ID. The SD ID/SD Name space for a specific P2P service may be controlled by a Service Specific Manager (SSM) or the like. For example, the SSM may provide only a UE subscribed to the P2P service with an appropriate key to identify the SD suffix for an Unmanaged SD ID and determine the corresponding SD Name.

In one example use of the SD ID for peer discovery by an application, the application may determine the level of privacy required during discovery based on user preference and operator provisioning. There may be no built-in privacy mechanisms defined beyond the ability to use an unmanaged SD ID. The table in FIG. 6 illustrates some example use cases on how to set the SD ID to achieve different levels of privacy. In addition, an application may choose to advertise in hidden mode where the UE only responds to Queries that match the SD ID or SD Prefix (i.e., no advertisements are sent).

Figure 7:
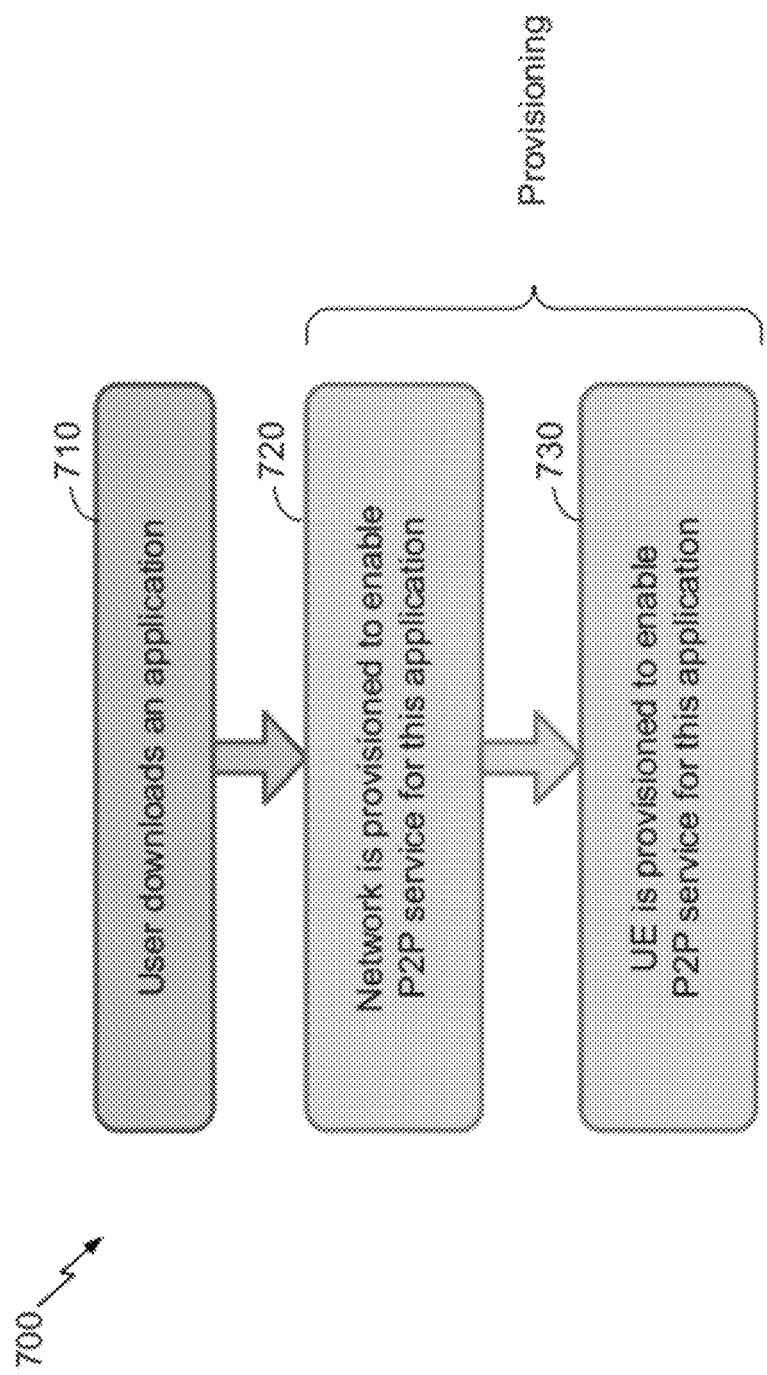
FIG. 7 is a flow diagram for an example initial setup of a P2P service.
Figure 8:
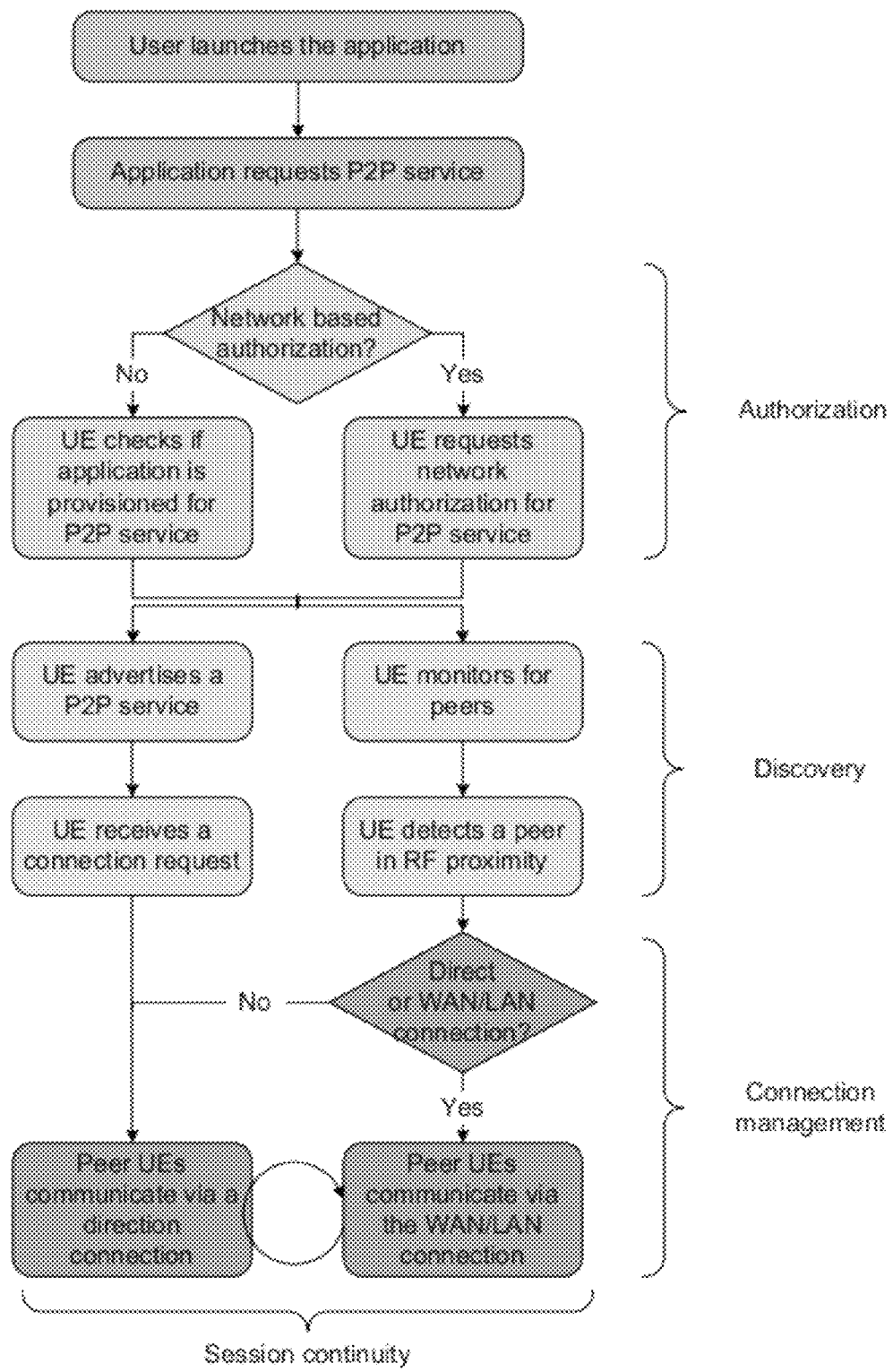
FIG. 8 is a flow diagram for an embodiment of device-to-device communication.

Further with respect to P2P services, provisioning and authorization may be required to enable P2P service, thereby ensuring only a UE with a valid subscription uses a given P2P service, and thereby allowing a given network to configure the resources allocated to P2P at the RAN or the core network (CN). With reference to FIG. 7, there is shown a flow diagram for an example methodology 700 of the initial setup of the P2P service triggered when a user downloads an application. For example, at 710, the user may download an application. At 720, the network may be provisioned to enable P2P service for this application. At 730, the UE may be provisioned to enable the P2P service for this application. It is noted that provisioning may be used to configure the UE for P2P service, which in turn allows the UE to be configured to only use specific services. A service may be provisioned in the network as part of the user subscription and on the UE, such as, for example, in the Universal Subscriber Identity Module (USIM), the mobile equipment (ME), or the like. The provisioning may be triggered by the user, the application, and/or based on operator policy. With reference to FIG. 8, there is provided a flow diagram for an example P2P service, wherein authorization may be used to allow a specific instance of a P2P service at the UE. In this example, no authorization is needed for detection.

The following procedures relate to SD Prefix and SD ID management in the P2P subsystem, and are described in further detail below: (a) allocating and registering a Managed SD Prefix; (b) allocating and registering a Managed SD ID; (c) provisioning the Unmanaged SD Prefix or Managed SD Prefix or SD ID in the user subscription information on the network; and (d) provisioning the Unmanaged SD Prefix or Managed SD Prefix or SD ID at the UE.

Figure 9:
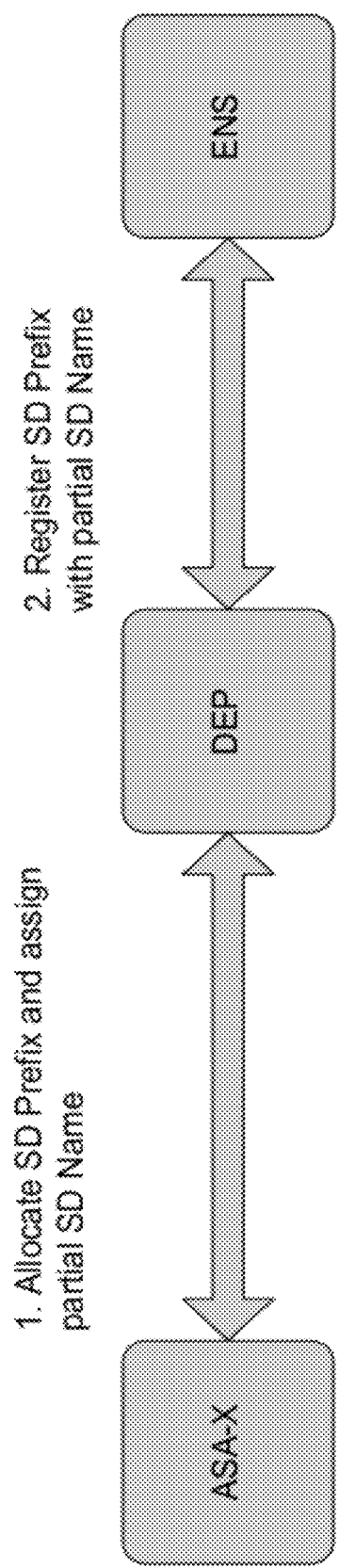
FIG. 9 illustrates an embodiment of a technique for SD Prefix allocation and registration.

Allocating and registering a Managed SD Prefix: With reference to FIG. 9, there is shown an example of how a SD Prefix is allocated by a direct expression provider (DEP) and registered at the ENS (for querying by other UEs). The Managed SD Prefix allocation and registration may be administered in a manner very that is analogous to how domain names are administered for the Internet. In one embodiment, an SD Prefix may be allocated when an application developer or someone representing a "service" (shown as ASA-X) applies for a new SD Prefix at an organization (shown as DEP) that plays, for example, an equivalent role in assigning SD Prefixes and SD Names as that of the Internet Corporation for Assigned Names and Numbers (ICANN) in assigning domain names. The ASA may apply for a SD Prefix either directly to the DEP (as shown) or via a registrar that in turn contacts the DEP as is done in the case of ICANN for domain names.

The DEP may be responsible for ensuring the uniqueness of a given assigned SD Prefix and placing the service within the correct service hierarchy based on the SD Prefix and partial SD Name where applicable. For example, the developer may pay a fee to be allocated a SD Prefix for a given service and the DEP may assign it a unique SD Prefix and a position for the service within the SD naming hierarchy. The DEP may also provide a partial SD Name for the service based on the hierarchy and the request from the developer. The hierarchy may include a relatively flat space, analogous to the .com domain space wherein each domain name that is part of .com is responsible for defining any hierarchy within that space, or it could be more structured to allow easier identification of specific services. Numerous types of hierarchy may be supported by appropriately partitioning the SD Prefix space. The DEP may issue a certificate to the ASA which attests to the assignment of the SD Prefix and SD Name to the ASA.

Once the DEP has determined the SD Prefix and corresponding partial SD Name, the DEP may register the information at the appropriate ENS as a part of the SD Prefix allocation. It is noted that the DEP may also maintain a published list of SD Prefix and partial SD Names that may be downloaded and cached to identify services associated with a SD Prefix without having to send a query to the ENS. The list may also indicate the SD Prefix, partial SD Name owner, as well as other information.

Figure 10:
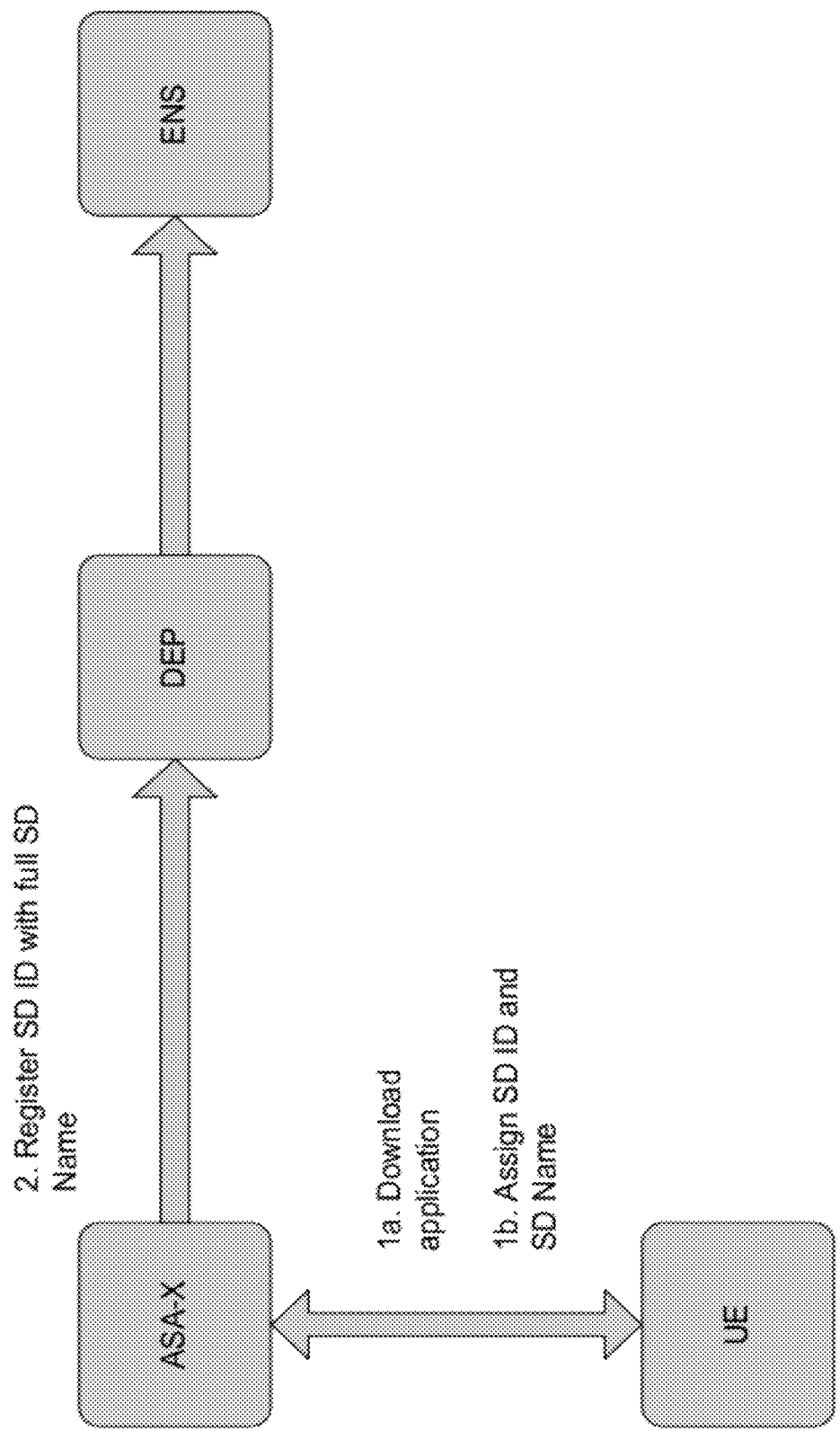
FIG. 10 illustrates an embodiment of a technique for SD ID allocation and registration.

Allocating and registering a Managed SD ID: With reference to FIG. 10, there is shown an example of how a SD ID may be allocated by the ASA and registered at the ENS (for querying by other UEs). SD ID allocation may be done per application or service and may be initiated, for example, at the time the UE downloads the application from the ASA or when the application contacts the ASA to enable or request a P2P service. SD ID registration may be handled by the ASA when the SD ID is assigned to the application. In one embodiment, the user may download the application that enables the P2P service from the ASA-X. If the application is to advertise its presence or establish a direct connection, the application may need to be assigned an SD ID and SD Name. In related aspects, instead of a full SD ID the application can be assigned a partial SD ID (not to be confused with an SD Prefix), such as, for example, the SD Prefix along with some additional bits. For example, a few of the least significant bits of the SD ID may be set by the user or application according to the application needs. This in effect means that the UE may actually own a prefix, albeit a long one (e.g., 120 bits). In further related aspects, the SD ID and the SD Name may come with a signature from the ASA to allow other UEs to authenticate the SD ID and the SD Name as being owned by the UE. For example, this signature may be issued by the certificate that the ASA received from the DEP.

The ASA may be responsible for registering the SD ID and the SD Name with the ENS as part of the allocation process. Depending on how the ENS is deployed and how the credentials are managed, the ASA may register the SD ID and SD Name directly at the ENS or via the DEP (as shown). Also, registration and allocation of a SD ID is needed if the UE wants to operate the service as a public SD ID (i.e., with a Managed SD Prefix and a public SD Suffix), such that the service can be identified by any UE.

Provisioning the Unmanaged SD Prefix or Managed SD Prefix or SD ID in the user subscription information on the network: In accordance with aspects of the embodiments described herein, there is provided a P2P administration server that hosts the functions for provisioning a P2P service in the user subscription on the network. Provisioning a SD ID or a SD Prefix for a subscriber may be initiated by the application, the user, and/or the operator.

In an application-driven embodiment, when a new application is released, then in accordance with a business agreement or other arrangement between the operator and the application developer, the operator may register an SD Prefix associated with the application with the P2P administration server for some set of users. For example, the operator may automatically include a new P2P service's SD Prefix into all users' subscriptions as part of an exclusive deal with the application developer. In another example, the operator may provision specific SD IDs for the application by allowing the application server to register the SD ID at the operator similar to how the SD ID is registered at the ENS.

In a user-driven embodiment, when a user downloads an application from the operator's applications or "apps" store, the application may automatically be directed to a URL of the P2P administration server to register the associated SD ID for that user. Alternatively, the modem may provide the SD ID or a list of SD IDs associated with applications on the UE to the P2P Administration Server using via an Open Mobile Alliance (OMA) Device Management (DM) procedure.

In a policy-driven embodiment, based on operator policy, a certain class of P2P services may be enabled for a set of UEs. For example, UEs that pay for a gold class subscription may use any Managed SD ID, whereas a platinum class subscription may allow any Managed SD ID and Unmanaged SD IDs. In this case, no interaction is needed between the user or the application and the operator.

Figure 11:
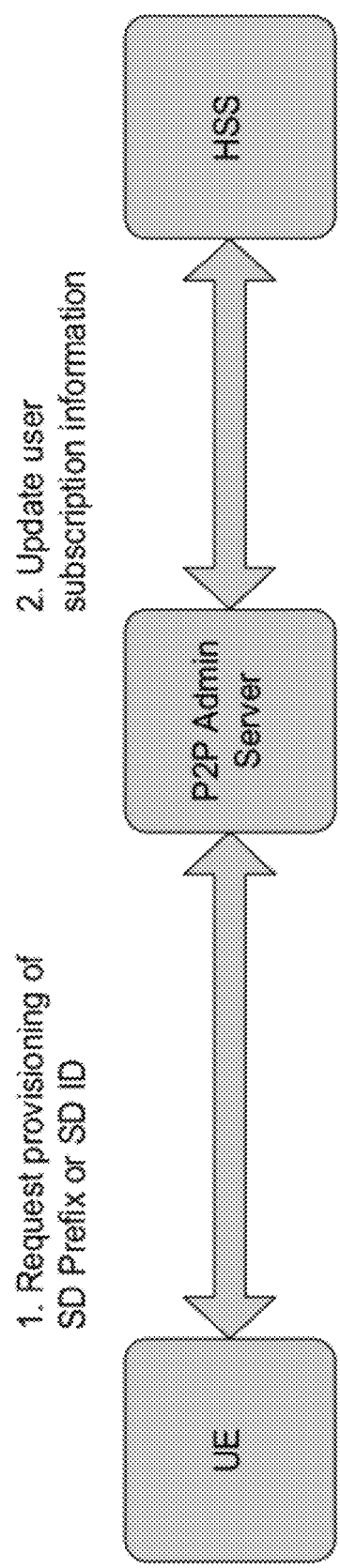
FIG. 11 illustrates an embodiment of a technique for provisioning an SD ID or SD Prefix in the user's subscription initiated by the Apps store.

For illustrative purposes, with reference to FIG. 11, there is shown how the SD ID or SD Prefix may provisioned in the user subscription information in the home subscriber server (HSS) by the UE, i.e., for user-driven provisioning. The UE, via a web page or via OMA DM, may request provisioning of a SD ID or SD Prefix at the P2P administration server. Provisioning a SD ID or a SD Prefix is subject to approval by the operator. For example, the P2P administration server may determine whether to approve the SD ID or the SD Prefix based on billing models, roaming agreements, etc. Once approved, the P2P administration server may communicate with the HSS to update the subscriber's SD subscription data stored in the HSS or the like. An expiration time may also be set as part of the subscription.

With continued reference to FIG. 11, if the UE is currently attached at a mobility management entity (MME) and the MME needs to know the P2P subscription data, then the HSS may send an Insert Subscriber Data (International Mobile Subscriber Identity (IMSI), Subscription Data) message indicating the change in P2P subscription data and the MME may return an Insert Subscriber Data Acknowledgment message to the HSS (not shown). It is noted that the UE modem may be provisioned with the list of authorized SD IDs and SD Prefixes according to the procedures and techniques described below (i.e., approval of the SD ID by the P2P administration server may not result in the UE updating the authorized list in the USIM or the ME.

Figure 12:
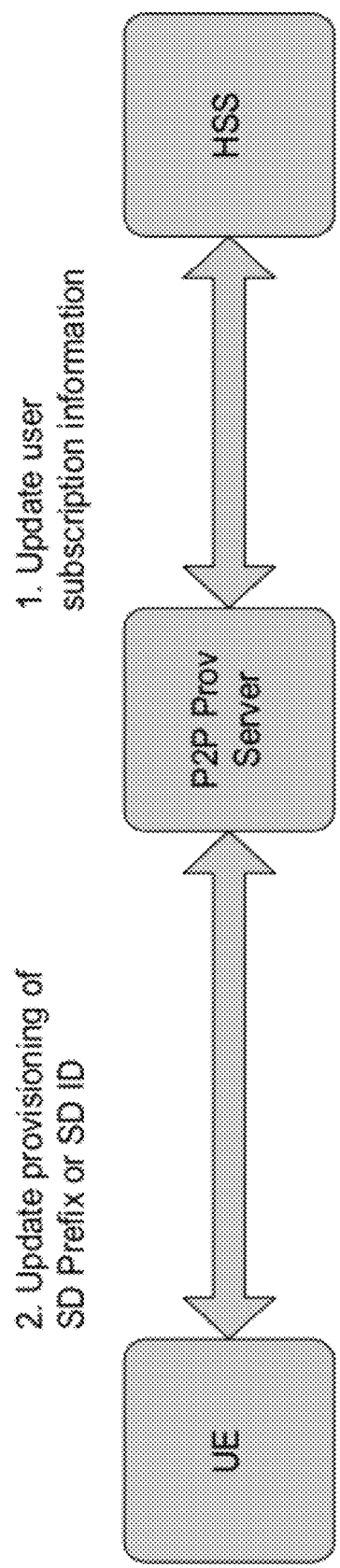
FIG. 12 illustrates an embodiment of a technique for provisioning a list of SD IDs and/or SD Prefixes at the UE.

Provisioning the Unmanaged SD Prefix, the Managed SD Prefix, or the SD ID at the UE: With reference to FIG. 12, there is shown how the SD ID or the SD Prefix is provisioned in the UE. The UE may be provisioned using OMA DM/over-the-air (OTA) and/or non-access stratum (NAS) procedures. In related aspects, the HSS may indicate to the P2P provisioning server that the user subscription has been updated and that the new information needs to be propagated to the UE. It is noted that the provisioning of the UE by the P2P provisioning server and the provisioning of the HSS by the P2P administration server may be performed independently by different systems. The temporal relationship between the two operations may depend on operator policy. In further related aspects, the P2P provisioning server may communicate with the UE via OMA DM/OTA to update the subscription in the UE. An expiration time may also be set as part of the subscription.

In accordance with one or more aspects of the embodiments described herein, there are provided techniques for provisioning and authorizing P2P service authorization (e.g., device-to-device communication authorization) at the UE. The following aspects need to be considered to support provisioning and authorization: (a) provisioning the set of P2P services at the UE; and (b) authorization of a P2P service by the network. Provisioning and authorization apply in the context of a compliant UE. As such careful consideration should be taken into the level of provisioning and authorization required, for while the design allows for flexibility as to the granularity of authorization allowed, e.g., per connection or per advertisement, it may not make sense from a signaling load point of view to deploy it this way and instead provisioning may be used as the primary tool to manage the UE behavior.

Figure 13:
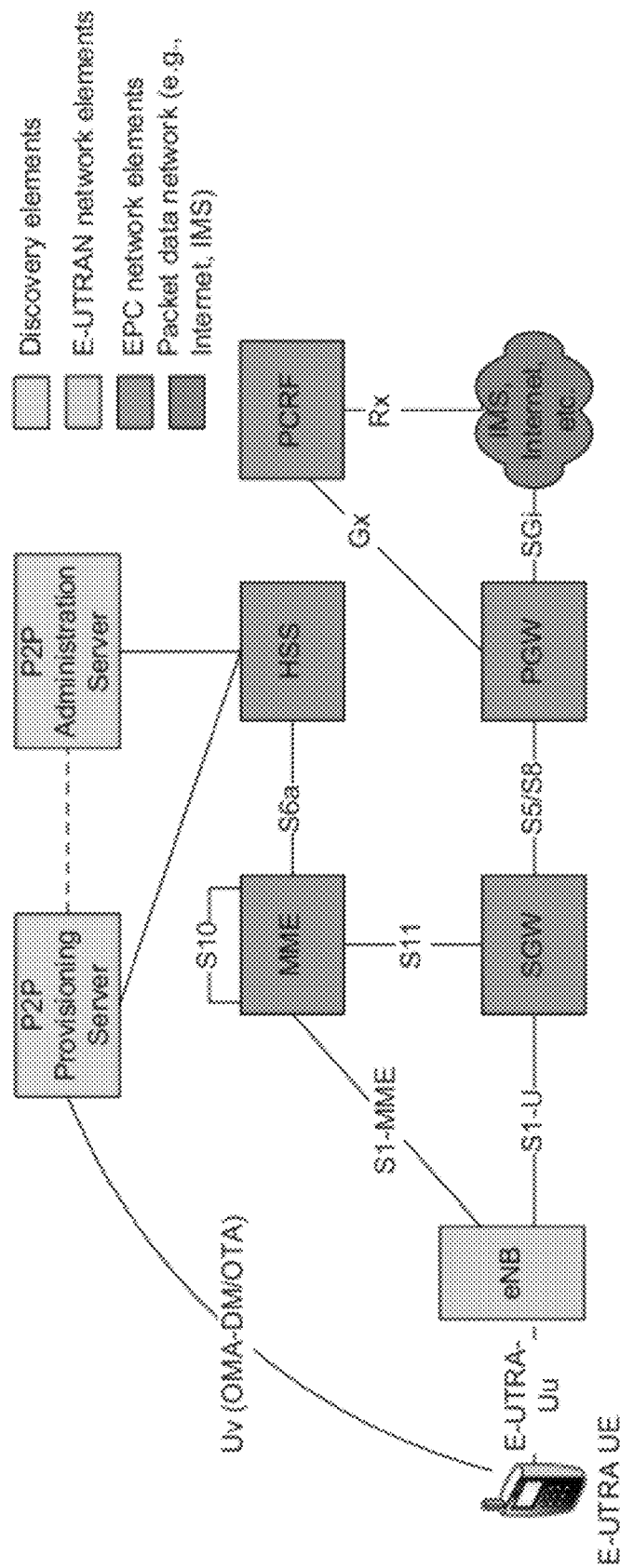
FIG. 13 shows an embodiment of an architecture reference model for provisioning and authorization where the underlying access network is LTE.

Provisioning and authorization architecture reference model: With reference to the embodiment of FIG. 13, there is shown a general architecture reference model for provisioning and authorization of the UE where the underlying access network is LTE. A new interface Uv (e.g., OMA DM/OTA) may be defined between the UE and the P2P provisioning server as described below. As shown, the P2P provisioning server and the P2P administration server have separate interfaces to the HSS. Alternatively, if the user subscription information is not needed in the HSS, the P2P administration server may instead connect directly to the P2P provisioning server.

In related aspects, general architecture reference model may include discovery elements (i.e., provisioning network elements), such as: a P2P administration server or module; and a P2P provisioning server or module. The P2P administration server or module may be configured to host functions used by the user or the application store to manage the P2P subscription information in the network for the UE. The P2P provisioning server or module may be configured to host functions used by the network to configure and manage the UE for discovery and direct connection establishment.

In further related aspects, the general architecture reference model may further include Evolved UMTS Terrestrial Radio Access Network (E-UTRAN) network elements, such as, eNBs or the like. The E-UTRAN network elements and functions may correspond to those defined in 3GPP Specification TS 36.300. The general architecture reference model may also include Evolved Packet Core (EPC) network elements, such as: an MME; an HSS; a policy charging and rules function (PCRF); a serving gateway (SGW); and a packet data network (PDN) gateway (PGW). The EPC network elements and functions may correspond to those defined in 3GPP Specification TS 23.401. The general architecture reference model may additionally include a packet data network, such as, for example, the Internet, an Internet Protocol (IP) Multimedia Subsystem (IMS), etc. In yet further related aspects, the table in FIG. 14 provides examples of the parameters that may be provisioned for discovery and direct connection establishment procedures on the UE.

Provisioning the set of P2P services at the UE: The UE may be provisioned using a combination of OMA DM/OTA and NAS procedures. For example, the OMA DM or OTA procedures may be used to provision the set of provisioning parameters defined in the table of FIG. 14. The use of OTA or OMA DM may be based on operator policy and the version of the USIM supported by the UE.

Provisioning at the UE using OMA DM: The OMA DM protocol enables distribution of information, such as, for example, applications, data and configuration settings to a single UE or groups of UEs. The OMA DM protocol allows for two-way communication and may be used for data exchange between an OMA DM server (which may manage the UE) and the OMA DM client. The communication protocol may be a request-response protocol and may support a push as well as a pull model. In the present example, it is assumed here that the UE contains an OMA DM client, and that the P2P provisioning server contains an OMA DM server.

In one embodiment, the OMA DM protocol may include two stages. The first stage may include bootstrapping, which may involve provisioning the OMA DM client to a state where it is able to initiate a management session to a new OMA DM server. The second stage may include DM provisioning, a process by which an OMA DM server provisions the UE with further information after the UE is bootstrapped. In the bootstrap process, a trust relationship may be established between the OMA DM client and the OMA DM server. There is only one bootstrap needed per OMA DM server and OMA DM client pair. Once the bootstrap process has been carried out, the OMA DM client in the UE and the OMA DM server in the P2P provisioning server may start to communicate using the OMA DM provisioning process. It is noted that either the UE or the P2P provisioning server may initiate the provisioning of information.

Figure 15:
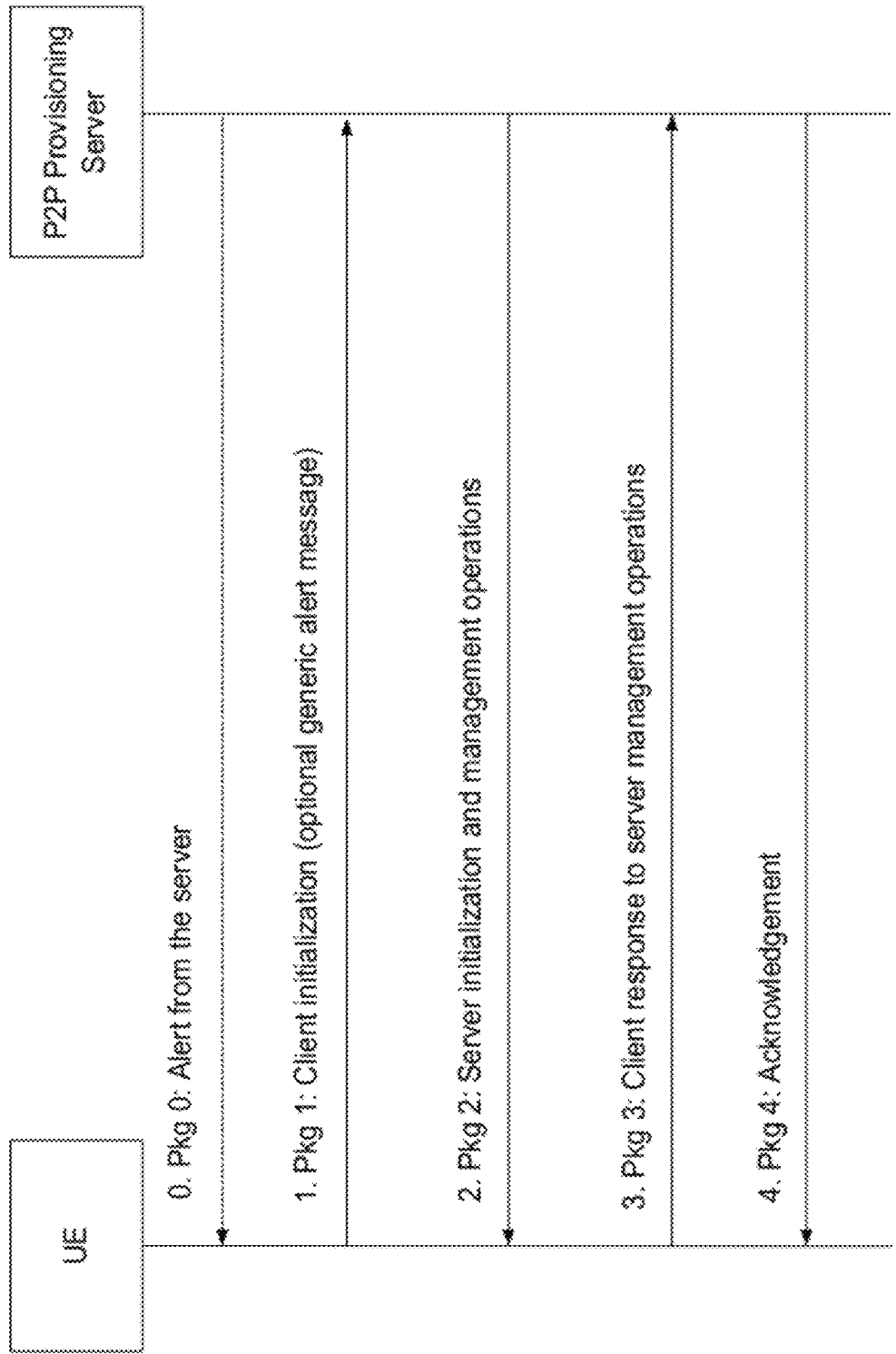
FIG. 15 shows an embodiment of a technique for OMA DM provisioning for P2P service.

With reference to FIG. 15, there is shown a typical message flow for OMA DM provisioning for P2P service. For example, at line 0, when the P2P provisioning server optionally initiates the provision of information, it may send an OMA DM package-0 that may include a session alert message to cause the UE to initiate a connection back to the P2P provisioning server. At line 1, the UE may send an OMA DM package-1 containing device information (e.g., manufacturer, model, etc), client identification, or the like. In the case the UE initiated the provisioning of information, package-1 may contain an indication of a client-initiated session, and a generic alert message. In the case the P2P provisioning server initiated the provisioning of information, package-1 may contain an indication of a server-initiated session. At line 2, the P2P Provisioning Server may send an OMA DM package-2 that may contain server identification, management data, and/or commands to update the Service Discovery MO in the UE. At line 3, the UE may send an OMA DM package-3 that may contain results of the management actions sent from server to the client. At line 4, the P2P provisioning server may send an OMA DM package-4 to close the management session. Further details regarding the different packages may be found in OMA-TS-DM_Protocol-V1_2 [7] and OMA-TS-DM_Notification-V1_2 [8].

Authorization of a P2P service by the network: In one embodiment, it is possible to authorize the UE to perform detection, advertising, and/or direct communication. With respect to detection, authorized UEs may be authorized and receive necessary information (e.g., security keys or the like) to perform the detection. With respect to advertising, authorized UEs may be authorized and receive necessary information (e.g., security keys or the like) to advertise a SD ID. Here, the UE enforces not advertising a SD ID for which it has not been authorized. With respect to direct communication, the UE does not establish direct communication with a peer advertising an SD ID for which it has not been authorized. The authorization and provisioning procedures may be used in the following possible combinations: authorization only; provisioning only; and combined provisioning and authorization.

With respect to authorization only, in this case the UE is not provisioned with P2P parameters and is expected to request authorization for each procedure or set of procedures. For example, the UE may request authorization for detection, detection and advertising, and/or direct communication. The authorization may be for a general use of the procedure or may apply to a specific SD ID or SD Prefix. The authorization may be per tracking area (for TAU), while attached (for the attach), or based on the lifetime of the reserved bearers (for the ESM procedures).

With respect to provisioning only, in this case the UE may be provisioned with the needed P2P parameters and does not need to use NAS to request authorization (e.g., the UE may be configured during provisioning to not request NAS, or no NAS support may be defined for authorization).

With respect to combined provisioning and authorization, in this case the UE may be provisioned with some of the needed P2P parameters but still may need to use NAS to request authorization. For example, the UE may need to use NAS to activate the use of P2P per tracking area (for TAU), while attached (for the attach), or based on the lifetime of the reserved bearers (for the ESM procedures), but otherwise may not need to use NAS to authorize individual discovery or connection establishment procedures.

With respect to the above-described OMA DM-based provisioning and authorization techniques, it is noted that a key network entity involved is the P2P provisioning server reachable over IP. The subscription data regarding P2P may be managed by the P2P provisioning server and/or by the HSS. The UE may obtain authorization from the P2P provisioning server over IP. Communication is possible as long as the UE has access to Internet (e.g., via LTE, UMTS, wireless LAN, etc.). It is further noted the above-described authorization technique is access agnostic. Further, the authorization procedure is common to multiple scenarios, such as, for example, when the UE is camping on an E-UTRAN or UTRAN network, and/or when the UE being out of coverage but in proximity of peer UE and W-LAN connectivity. In addition, no changes are needed to existing 3GPP network entities.

In view of exemplary systems shown and described herein, methodologies that may be implemented in accordance with the disclosed subject matter, will be better appreciated with reference to various flow charts. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 16:
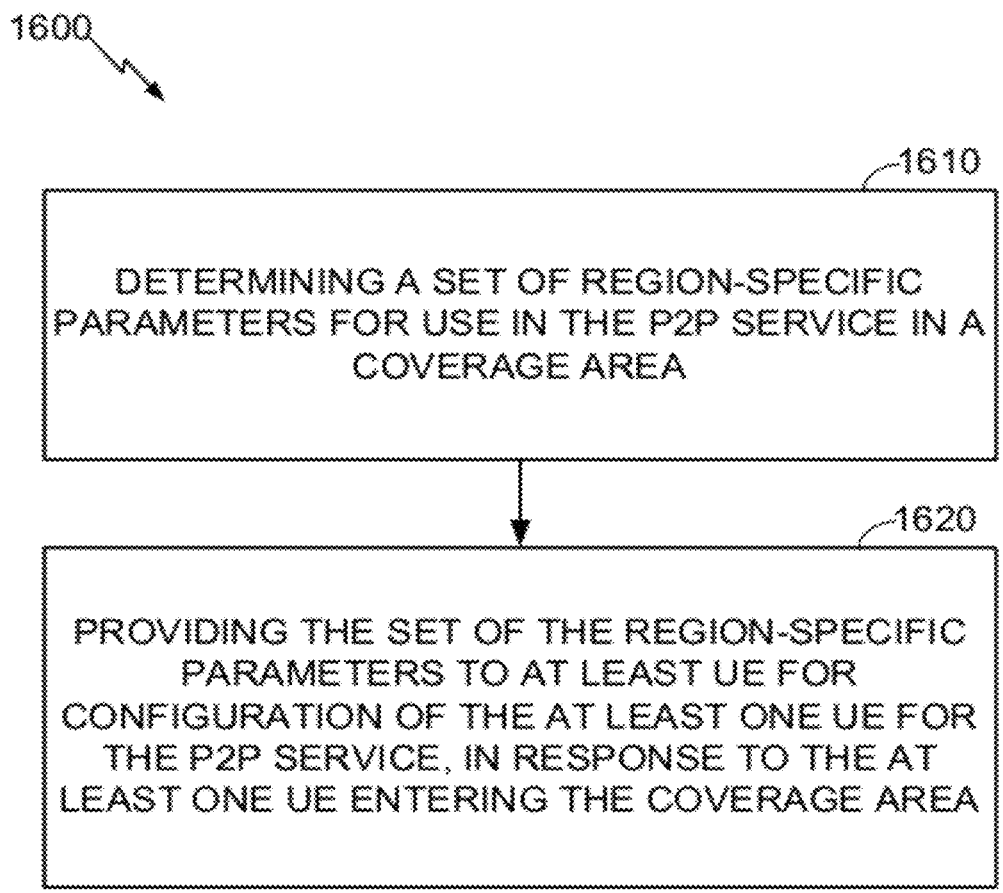
FIG. 16 shows a methodology for provisioning a P2P service by a network entity.

In accordance with one or more aspects of the subject of this disclosure, there are provided methods for provisioning a P2P service (e.g., device-to-device communication for a plurality of UEs). With reference to FIG. 16, illustrated is a methodology 1600 that may be performed at a network entity, such as, for example, a P2P configuration server, a P2P configuration module and/or a P2P administration module, or the like. The method 1600 may involve, at 1610, determining a set of region-specific parameters for use in the P2P service in a coverage area. The method 1600 may involve, at 1620, providing the set of the region-specific parameters to at least UE for configuration of the at least one UE for the P2P service, in response to the at least one UE entering the coverage area.

Figure 17A:
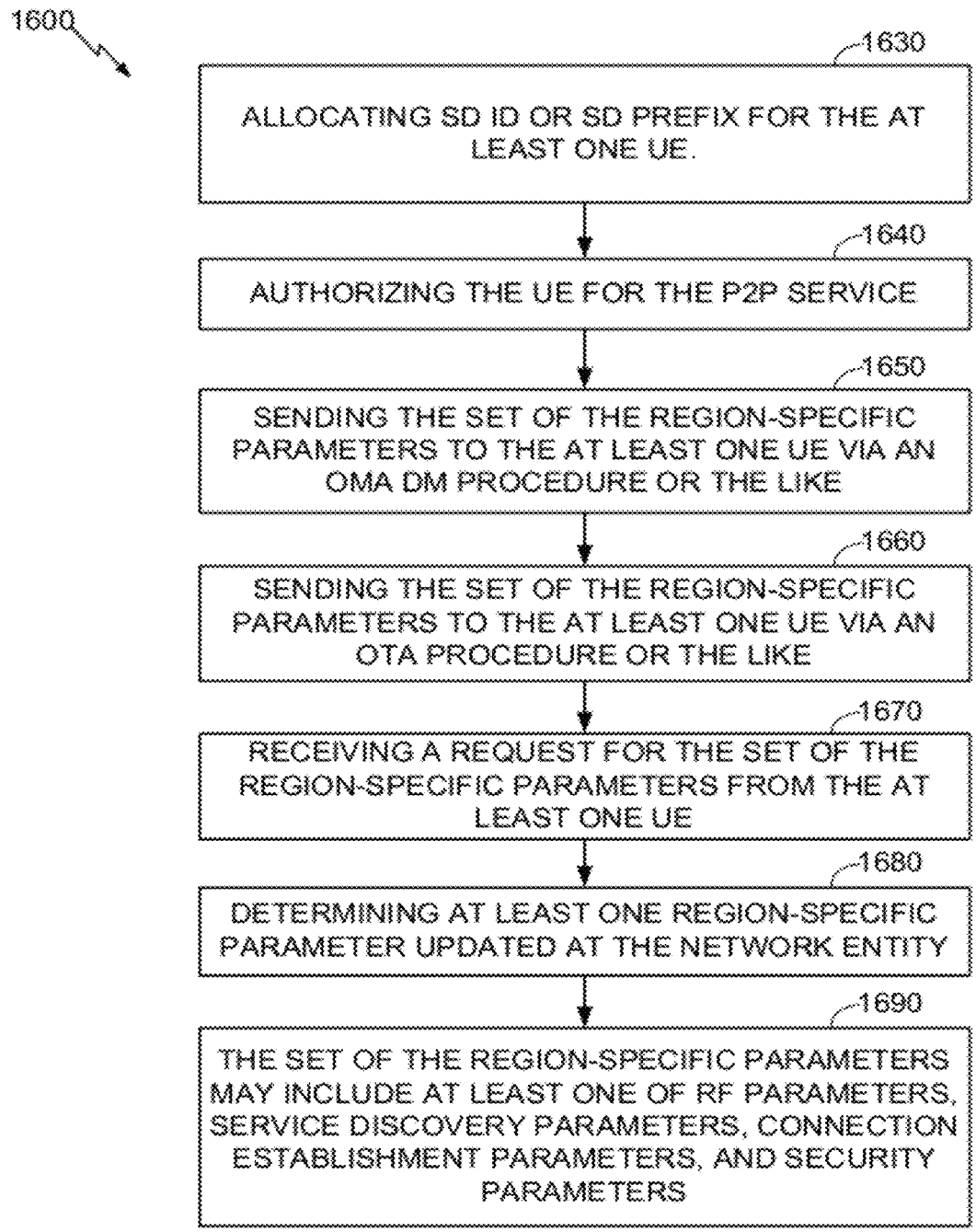
FIGS. 17A-B show further aspects of the methodology of FIG. 16.
Figure 17B:
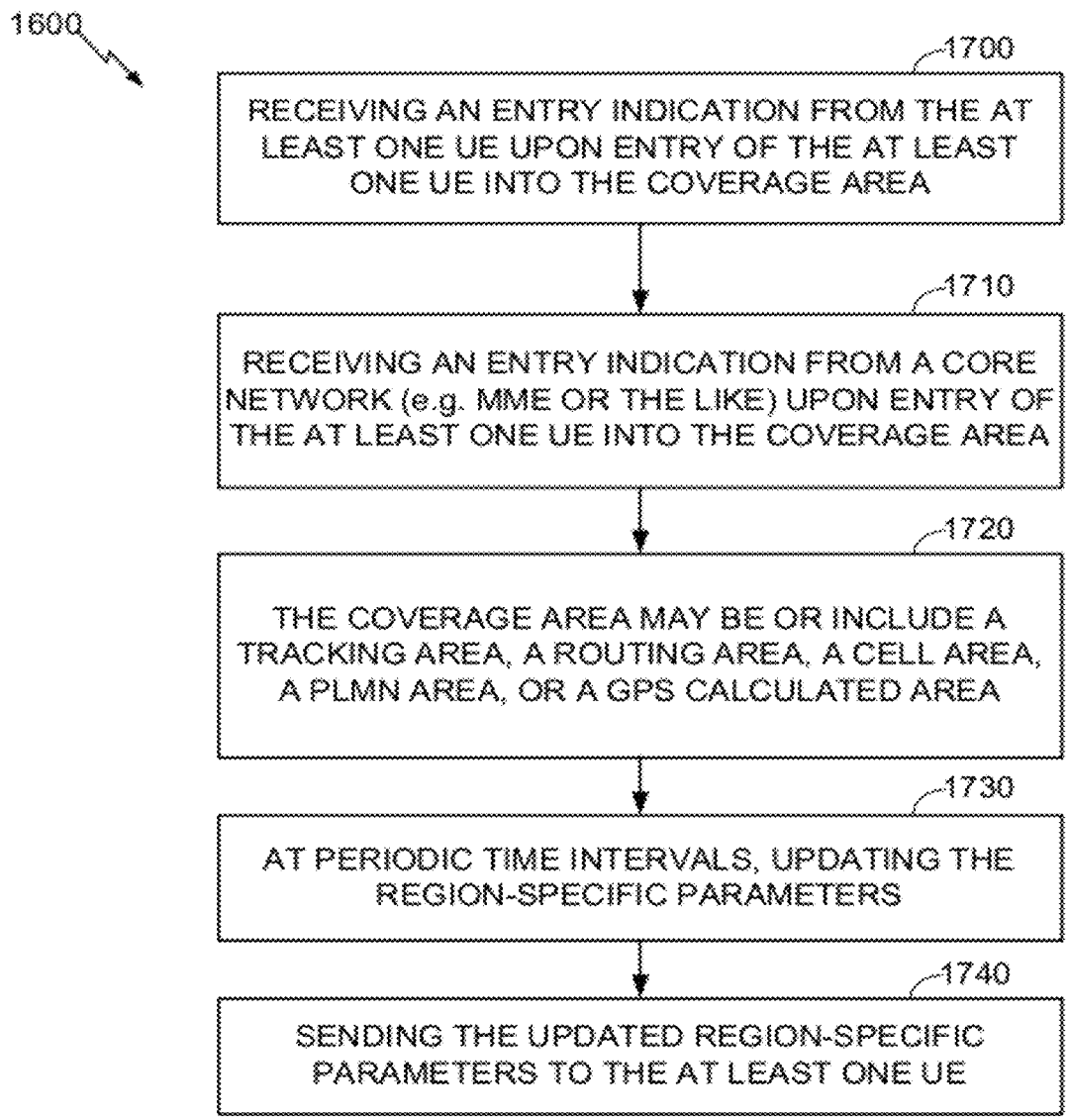

With reference to FIGS. 17A-B, there are shown further operations or aspects of method 1600 that are optional and may be performed by a network entity for provisioning a P2P service. It is noted that the blocks shown in FIGS. 17A-B are not required to perform the method 1600. If the method 1600 includes at least one block of FIGS. 17A-B, then the method 1600 may terminate after the at least one block, without necessarily having to include any subsequent downstream block(s) that may be illustrated. It is further noted that numbers of the blocks do not imply a particular order in which the blocks may be performed according to the method 1600. For example, with reference to FIG. 17A, determining may involve, at 1630, allocating at least one of an SD ID and an SD prefix (e.g., a managed SD prefix and an unmanaged SD prefix) for the at least one UE. Determining may involve, at 1640, authorizing the UE for the P2P service, wherein the set of the region-specific parameters may include authorization parameters for authorizing the UE for the P2P service.

In related aspects, providing may involve, at 1650, sending the set of the region-specific parameters to the at least one UE via an OMA DM procedure or the like. In the alternative, or in addition, providing may involve, at 1660, sending the set of the region-specific parameters to the at least one UE via an OTA procedure. The method 1600 may further involve, at 1670, receiving a request for the set of the region-specific parameters from the at least one UE. Determining may involve, at 1680, determining at least one parameter updated at the network entity, wherein the at least one parameter may be updated at the network entity, in response to a new application being enabled for P2P service. In further related aspects, the set of the region-specific parameters may include at least one of RF parameters, service discovery parameters, connection establishment parameters, and security parameters (block 1690). In further related aspects, the P2P service may include at least one of discovery of a peer device and establishment of a connection with the discovered peer device.

With reference to FIG. 17B, the method 1600 may involve, at 1700, receiving an entry indication from the at least one UE upon entry of the at least one UE into the coverage area. In the alternative, or in addition, the method 1600 may involve, at 1710, receiving an entry indication from a core network (e.g. an MME or the like) upon entry of the at least one UE into the coverage area. In related aspects, the coverage area may be or include a tracking area, a routing area, a cell area, a public land mobile network (PLMN) area, or a global positioning system (GPS) calculated area (block 1720). For example, the GPS calculated area may based on determining a position of a given device (e.g., a network entity) and defining an area within a given distance of the determined position. In one example, the GPS calculated area may be a circular area around a determined position of the network entity, wherein the circular area is calculated based in part on a defined radius or the like. In further related aspects, the method may involve: at periodic time intervals, updating the region-specific parameters (block 1730); and sending the updated region-specific parameters to the at least one UE (block 1740).

Figure 18:
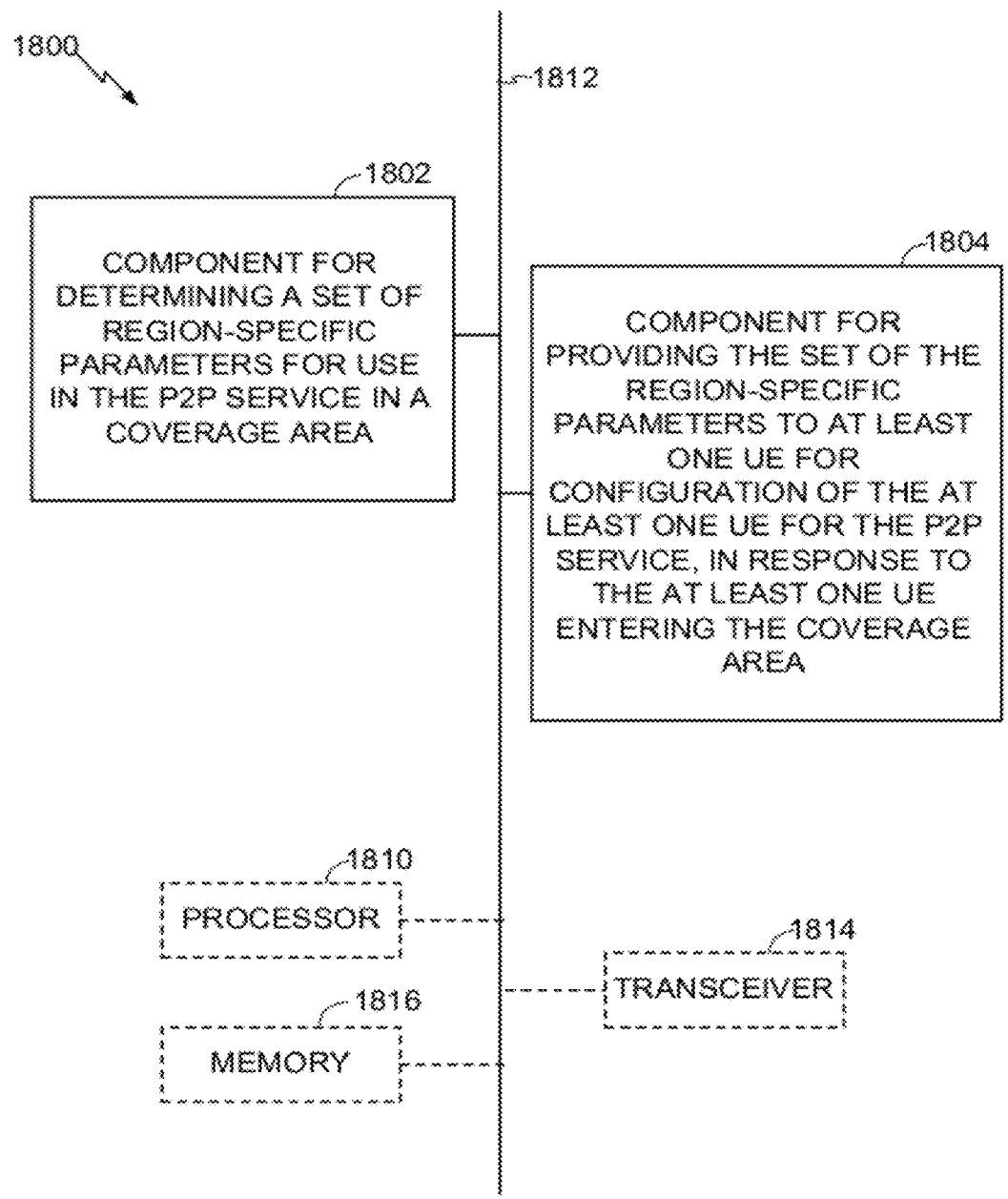
FIG. 18 shows an apparatus for network provisioning, in accordance with the methodology of FIGS. 16-17B.

In accordance with one or more aspects of the embodiments described herein, there are provided devices and apparatuses for provisioning a P2P service, as described above with reference to FIGS. 16-17B. With reference to FIG. 18, there is provided an exemplary apparatus 1800 that may be configured as a network entity, in a wireless network, or as a processor or similar device for use within the network entity. The apparatus 1800 may include functional blocks that can represent functions implemented by a processor, software, or combination thereof (e.g., firmware).

For example, the apparatus 1800 of FIG. 18 may comprise an electrical component or module 1802 for determining a set of region-specific parameters for use in the P2P service in a coverage area. The apparatus 1800 may comprise an electrical component 1804 for providing the set of the region-specific parameters to at least one UE for configuration of the at least one UE for the P2P service, in response to the at least one UE entering the coverage area.

In related aspects, the apparatus 1800 may optionally include a processor component 1810 having at least one processor, in the case of the apparatus 1800 configured as a network entity, rather than as a processor. The processor 1810, in such case, may be in operative communication with the components 1802-1804 via a bus 1812 or similar communication coupling. The processor 1810 may effect initiation and scheduling of the processes or functions performed by electrical components 1802-1804.

In further related aspects, the apparatus 1800 may include a radio transceiver component 1814. A stand alone receiver and/or stand alone transmitter may be used in lieu of or in conjunction with the transceiver 1814. The apparatus 1800 may optionally include a component for storing information, such as, for example, a memory device/component 1816. The computer readable medium or the memory component 1816 may be operatively coupled to the other components of the apparatus 1800 via the bus 1812 or the like. The memory component 1816 may be adapted to store computer readable instructions and data for effecting the processes and behavior of the components 1802-1804, and subcomponents thereof, or the processor 1810, or the methods disclosed herein. The memory component 1816 may retain instructions for executing functions associated with the components 1802-1804. While shown as being external to the memory 1816, it is to be understood that the components 1802-1804 can exist within the memory 1816.

Figure 19:
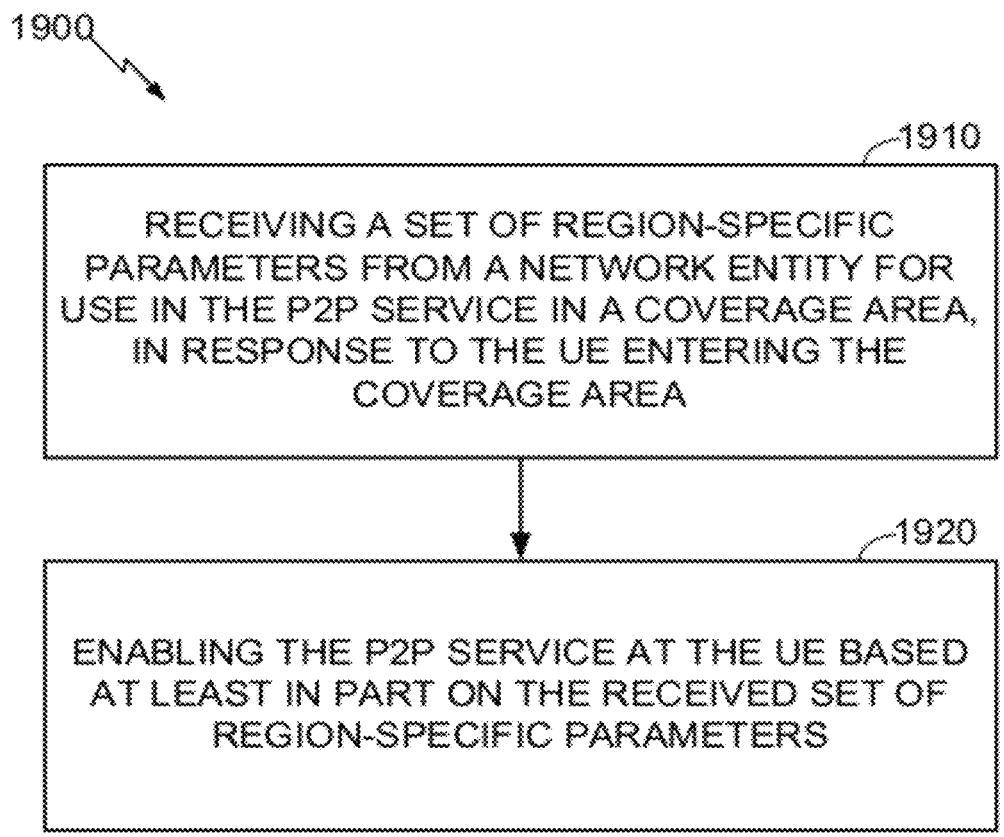
FIG. 19 shows a methodology for provisioning a P2P service by a mobile entity.

In accordance with one or more aspects of the embodiments described herein, there is shown in FIG. 19 a methodology 1900 for network provisioning that may be performed by a mobile entity (e.g., a UE). The method 1900 may involve, at 1910, receiving a set of region-specific parameters from a network entity for use in the P2P service in a coverage area, in response to the UE entering the coverage area. The method 1900 may involve, at 1920, enabling the P2P service at the UE based at least in part on the received set of region-specific parameters.

Figure 20:
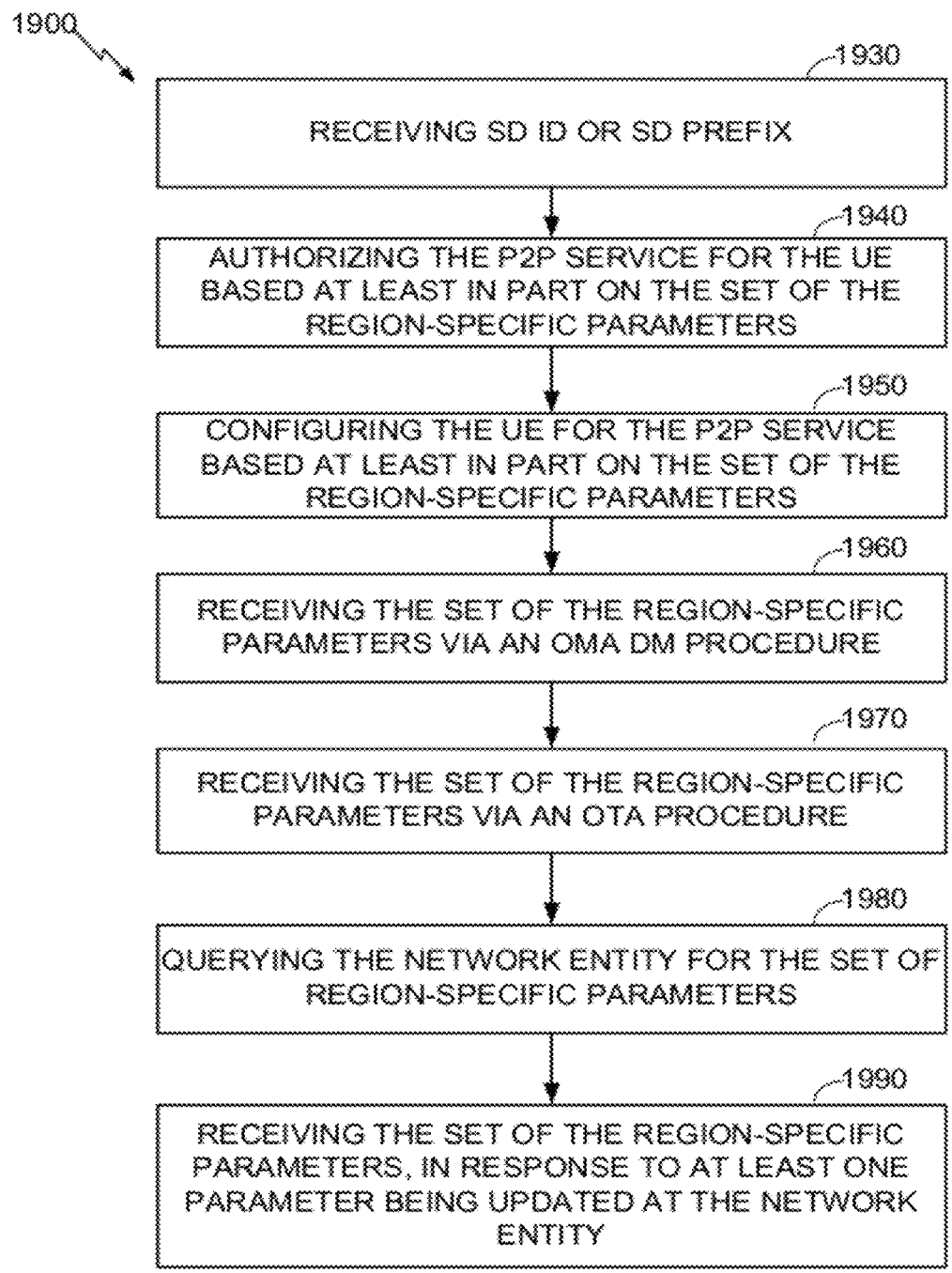
FIGS. 20-21B show further aspects of the methodology of FIG. 19.

With reference to FIG. 20, there are shown further operations or aspects of method 1900 that are optional and may be performed by a mobile entity for provisioning a P2P service. It is noted that the blocks shown in FIGS. 20-21B are not required to perform the method 1900. If the method 1900 includes at least one block of FIGS. 20-21B, then the method 1900 may terminate after the at least one block, without necessarily having to include any subsequent downstream block(s) that may be illustrated. It is further noted that numbers of the blocks do not imply a particular order in which the blocks may be performed according to the method 1900. For example, receiving may involve, at 1930, receiving at least one of an SD ID and an SD prefix. Enabling may involve, at 1940, authorizing the P2P service for the UE based at least in part on the set of the region-specific parameters. In the alternative, or in addition, enabling may involve, at 1950, configuring the UE for the P2P service based at least in part on the set of the region-specific parameters.

In related aspects, receiving may involve, at 1960, receiving the set of the region-specific parameters via an OMA DM procedure or the like. In the alternative, or in addition, receiving may involve, at 1970, receiving the set of the region-specific parameters via an OTA procedure. In further related aspects, the method 1900 may further involve, at 1980, querying the network entity for the set of region-specific parameters. Receiving may involve, at 1990, receiving the set of the region-specific parameters, in response to at least one parameter being updated at the network entity.

Figure 21A:
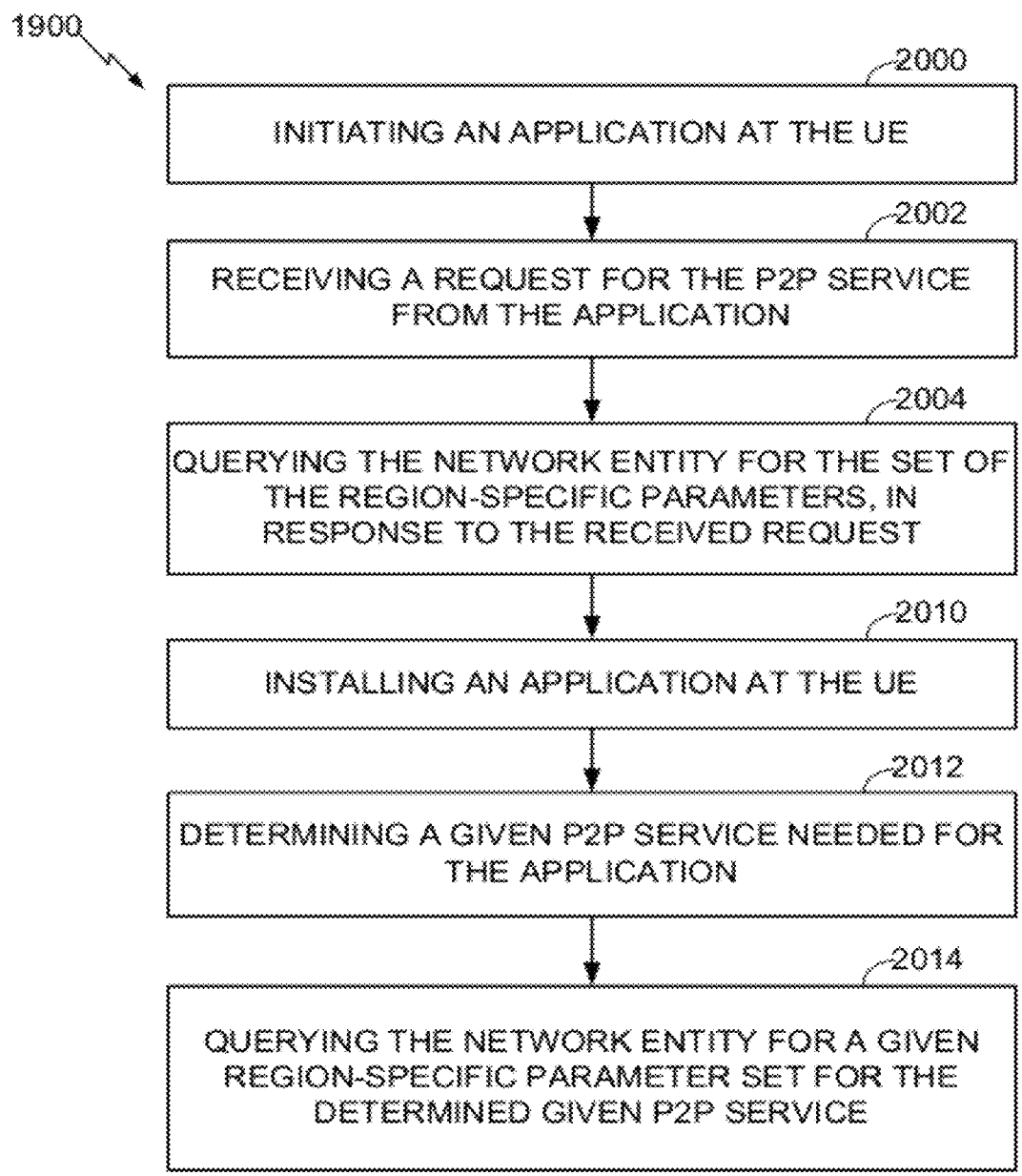
Figure 21B:
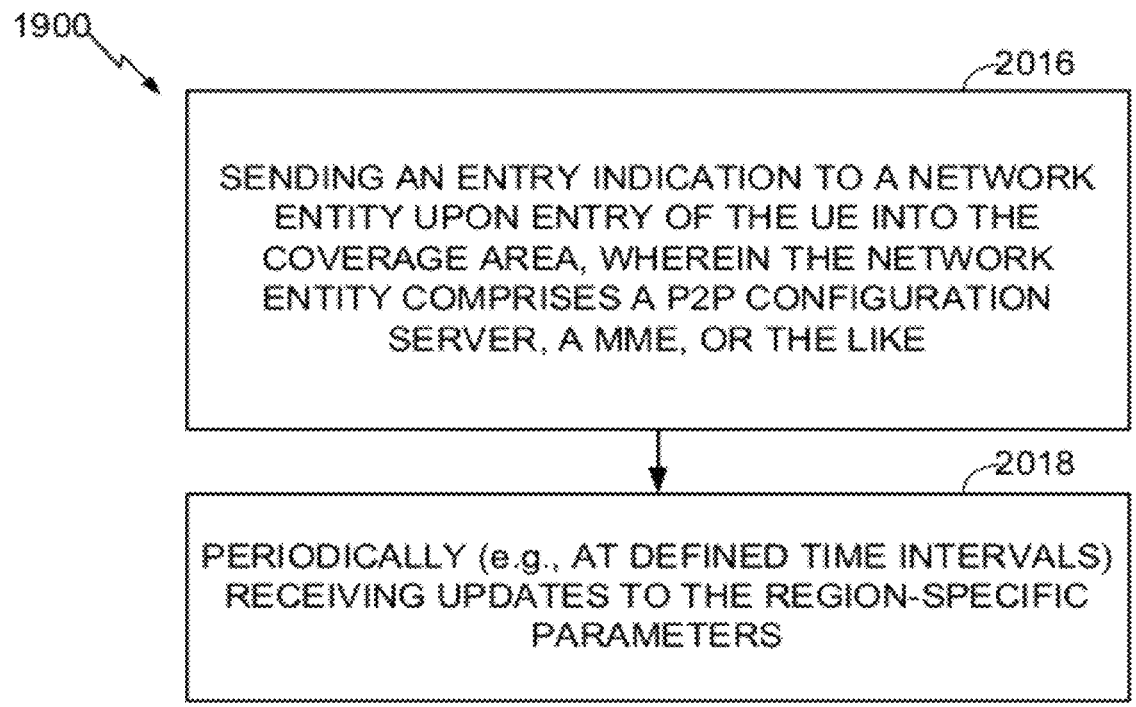

With reference to FIG. 21A, in one embodiment, the method 1900 may involve, at 2000, initiating an application at the UE. The method 1900 may further involve, at 2002, receiving a request for the P2P service from the application. The method 1900 may also involve, at 2004, querying the network entity for the set of the region-specific parameters, in response to the received request. In another embodiment, the method 1900 may involve, at 2010, installing an application at the UE. The method 1900 may further involve, at 2012, determining a given P2P service needed for the application. The may also involve, at 2014, querying the network entity for a given region-specific parameter set for the determined given P2P service.

With reference to FIG. 21B, in one embodiment, the method 1900 may involve, at 2016, sending an entry indication to a network entity upon entry of the UE into the coverage area, wherein the network entity comprises a P2P configuration server, a MME, or the like. In related aspects, method 1900 may further involve, at 2018, periodically (e.g., at defined time intervals) receiving updates to the region-specific parameters.

Figure 22:
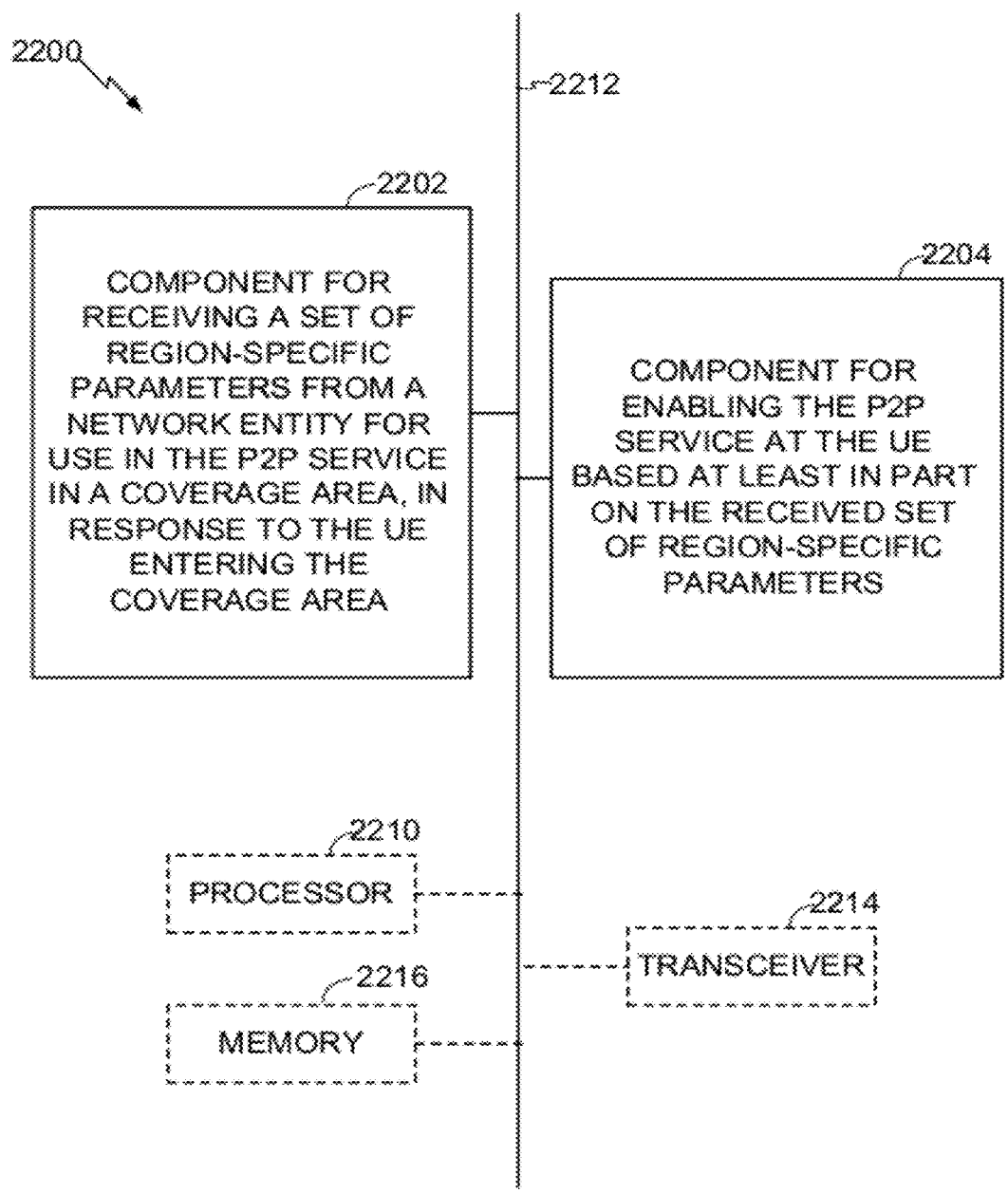
FIG. 22 shows an apparatus for network provisioning, in accordance with the methodology of FIGS. 19-21B.

In accordance with one or more aspects of the embodiments described herein, there are provided devices and apparatuses (e.g., UEs) for network provisioning of a P2P service, as described above with reference to FIGS. 19-21B. With reference to FIG. 22, the apparatus 2200 may comprise an electrical component or module 2202 for receiving a set of region-specific parameters from a network entity for use in the P2P service in a coverage area, in response to the UE entering the coverage area. The apparatus 2200 may comprise an electrical component 2204 for enabling the P2P service at the UE based at least in part on the received set of region-specific parameters. For the sake of conciseness, the rest of the details regarding apparatus 2200 are not further elaborated on; however, it is to be understood that the remaining features and aspects of the apparatus 2200 are substantially similar to those described above with respect to apparatus 1800 of FIG. 18.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or non-transitory wireless technologies, then the coaxial cable, fiber optic cable, twisted pair, DSL, or the non-transitory wireless technologies are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for provisioning a peer-to-peer (P2P) service by a network entity, comprising:
    determining a set of region-specific parameters for use in the P2P service in a coverage area, wherein the set of the region-specific parameters comprises at least one of RF parameters, connection establishment parameters, or security parameters;
    providing the set of the region-specific parameters to at least one user equipment (UE) for configuration of the at least one UE for the P2P service, in response to the at least one UE entering the coverage area;
    at periodic time intervals during the P2P service, updating the set of the region-specific parameters, wherein at least one region-specific parameter, of the set of the region-specific parameters, is updated based on a new application being enabled for the P2P service; and
    providing the updated set of the region-specific parameters to the at least one UE.

2. The method of claim 1, wherein providing the set of the region-specific parameters comprises sending the set of the region-specific parameters to the at least one UE via (a) an Open Mobile Alliance (OMA) Device Management (DM) procedure or (b) via an over-the-air (OTA) procedure.

3. The method of claim 1, wherein the network entity comprises a P2P configuration server.

4. The method of claim 1, further comprising receiving an entry indication from the at least one UE upon entry of the at least one UE into the coverage area.

5. The method of claim 1, further comprising receiving an entry indication from a core network upon entry of the at least one UE into the coverage area.

6. The method of claim 5, wherein the core network comprises a mobility management entity (MME).

7. The method of claim 1, wherein the coverage area comprises a tracking area, a routing area, a cell area, a public land mobile network (PLMN) area, or a global positioning system (GPS) calculated area.

8. An apparatus for provisioning a peer-to-peer (P2P) service by a network entity, comprising:
    a memory for storing data; and
    at least one processor coupled to the memory and configured to:
        determine a set of region-specific parameters for use in the P2P service in a coverage area, wherein the set of the region-specific parameters comprises at least one of RF parameters, connection establishment parameters, or security parameters;
        provide the set of the region-specific parameters to at least one user equipment (UE) for configuration of the at least one UE for the P2P service, in response to the at least one UE entering the coverage area;
        at periodic time intervals during the P2P service, update the set of the region-specific parameters, wherein at least one region-specific parameter, of the set of the region-specific parameters, is updated based on a new application being enabled for the P2P service; and
        provide the updated set of the region-specific parameters to the at least one UE.

9. The apparatus of claim 8, wherein, when providing the set of the region-specific parameters, the at least one processor is configured to send the set of the region-specific parameters to the at least one UE via an Open Mobile Alliance (OMA) Device Management (DM) procedure or via an over-the-air (OTA) procedure.

10. An apparatus for provisioning a peer-to-peer (P2P) service, comprising:
    means for determining a set of region-specific parameters for use in the P2P service in a coverage area, wherein the set of the region-specific parameters comprises at least one of RF parameters, connection establishment parameters, or security parameters;
    means for providing the set of the region-specific parameters to at least one user equipment (UE) for configuration of the at least one UE for the P2P service, in response to the at least one UE entering the coverage area;
    means for updating, at periodic time intervals during the P2P service, the set of the region-specific parameters, wherein at least one region-specific parameter, of the set of the region-specific parameters, is updated based on a new application being enabled for the P2P service; and
    means for providing the updated set of the region-specific parameters to the at least one UE.

11. A non-transitory computer-readable medium storing instructions, the instructions comprising:
    one or more instructions which, when executed by a processor, cause the processor to:

determine a set of region-specific parameters for use in a peer-to-peer (P2P) service in a coverage area, wherein the set of the region-specific parameters comprises at least one of RF parameters, connection establishment parameters, or security parameters;

provide the set of the region-specific parameters to at least one user equipment (UE) for configuration of the at least one UE for the P2P service, in response to the at least one UE entering the coverage area;

at periodic time intervals during the P2P service, update the set of the region-specific parameters, wherein at least one region-specific parameter, of the set of the region-specific parameters, is updated based on a new application being enabled for the P2P service; and provide the updated set of the region-specific parameters to the at least one UE.

12. The non-transitory computer-readable medium of claim 11, wherein the instructions further include:
one or more instructions to receive an entry indication from the at least one UE upon entry of the at least one UE into the coverage area.

13. A method for provisioning a peer-to-peer (P2P) service at a user equipment (UE), comprising:
querying a network entity for at least one region-specific parameter, of a set of region-specific parameters, for the P2P service based at least in part on the P2P service being needed for an application at the UE, wherein the set of the region-specific parameters comprises at least one of RF parameters, connection establishment parameters, or security parameters;
receiving the set of the region-specific parameters from the network entity for use in the P2P service in a coverage area, in response to the UE entering the coverage area;
receiving, at periodic intervals during the P2P service, updated region-specific parameters; and
enabling the P2P service at the UE based at least in part on the received set of the region-specific parameters.

14. The method of claim 13, wherein enabling comprises (a) authorizing the P2P service for the UE based at least in part on the set of the region-specific parameters or (b) configuring the UE for the P2P service based at least in part on the set of the region-specific parameters.

15. The method of claim 13, wherein receiving the set of the region-specific parameters comprises receiving the set of the region-specific parameters in response to at least one region-specific parameter being updated at the network entity.

16. The method of claim 13, further comprising:
initiating the application at the UE; and
receiving a request for the P2P service from the application,
wherein determining the P2P service needed for the application at the UE comprises:
determining the P2P service needed for the application at the UE based on the received request.

17. The method of claim 13, further comprising:
installing the application at the UE.

18. The method of claim 13, further comprising sending an entry indication to the network entity upon entry of the UE into the coverage area.

19. The method of claim 13, wherein the network entity comprises a P2P configuration server or a mobility management entity (MME).

20. The method of claim 13, wherein the coverage area comprises one of a tracking area, a routing area, a cell area, a public land mobile network (PLMN) area, or a global positioning system (GPS) calculated area.

21. An apparatus for provisioning a peer-to-peer (P2P) service at a user equipment (UE), comprising:
a memory for storing data; and
at least one processor coupled to the memory and configured to:
query a network entity for at least one region-specific parameter, of a set of region-specific parameters, for the P2P service based at least in part on the P2P service being needed for an application at the UE, wherein the set of the region-specific parameters comprises at least one of RF parameters, connection establishment parameters, or security parameters,
receive the set of the region-specific parameters from the network entity for use in the P2P service in a coverage area, in response to the UE entering the coverage area,
enable the P2P service at the UE based at least in part on the received set of the region-specific parameters, and
receive, at periodic intervals during the P2P service, updated region-specific parameters.

22. The apparatus of claim 21, wherein the at least one processor is further configured to:
initiate the application at the UE; and
receive a request for the P2P service from the application.

23. An apparatus for provisioning a peer-to-peer (P2P) service, comprising:
means for querying a network entity for at least one region-specific parameter, of a set of region-specific parameters, for the P2P service based at least in part on the P2P service being needed for an application at a user equipment (UE), wherein the set of the region-specific parameters comprises at least one of RF parameters, connection establishment parameters, or security parameters;
means for receiving the set of the region-specific parameters from a network entity for use in the P2P service in a coverage area, in response to the UE entering the coverage area;
means for receiving, at periodic intervals during the P2P service, updated region-specific parameters; and
means for enabling the P2P service at the UE based at least in part on the received set of the region-specific parameters.

24. The apparatus of claim 23, further comprising:
means for installing the application at the UE.

25. A non-transitory computer-readable medium storing instructions, the instructions comprising:
one or more instructions which, when executed by a processor, cause the processor to:
query a network entity for at least one region-specific parameter, of a set of region-specific parameters, for a peer-to-peer (P2P) service based at least in part on the P2P service being needed for an application at a user equipment (UE), wherein the set of the region-specific parameters comprises at least one of RF parameters, connection establishment parameters, or security parameters;
receive the set of the region-specific parameters from a network entity for use in the P2P service in a coverage area, in response to the UE entering the coverage area;
receive, at periodic intervals during the P2P service, updated region-specific parameters; and enable the P2P service at the UE based at least in part on the received set of the region-specific parameters.

26. The non-transitory computer-readable medium of claim 25, wherein the instructions further include:
one or more instructions to send an entry indication to the network entity upon entry of the UE into the coverage area.

* * * * *